United States Patent
Sun et al.

(10) Patent No.: US 12,402,029 B2
(45) Date of Patent: Aug. 26, 2025

(54) COMMUNICATION METHOD, APPARATUS, AND SYSTEM

(71) Applicant: HUAWEI TECHNOLOGIES CO., LTD., Guangdong (CN)

(72) Inventors: Haiyang Sun, Beijing (CN); Fangyuan Zhu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 291 days.

(21) Appl. No.: 17/733,337

(22) Filed: Apr. 29, 2022

(65) Prior Publication Data

US 2022/0256395 A1 Aug. 11, 2022

Related U.S. Application Data

(63) Continuation of application No. PCT/CN2019/114797, filed on Oct. 31, 2019.

(51) Int. Cl.
*H04W 28/02* (2009.01)
*H04W 28/10* (2009.01)

(52) U.S. Cl.
CPC ... *H04W 28/0268* (2013.01); *H04W 28/0257* (2013.01); *H04W 28/10* (2013.01)

(58) Field of Classification Search
CPC ......... H04W 28/0257; H04W 28/0268; H04W 28/10; H04W 28/24; H04W 28/22; H04W 48/18; H04W 28/02; H04W 48/12; H04W 8/065; H04W 8/18; H04L 47/2425
See application file for complete search history.

(56) References Cited

U.S. PATENT DOCUMENTS

| | | | | |
|---|---|---|---|---|
| 9,210,564 | B2 * | 12/2015 | Yang | H04W 8/18 |
| 10,841,835 | B2 * | 11/2020 | Castro Castro | H04W 76/16 |
| 11,589,262 | B2 * | 2/2023 | Wang | H04W 28/08 |
| 2013/0188527 | A1 * | 7/2013 | Yang | H04W 28/22 |
| | | | | 370/259 |

(Continued)

FOREIGN PATENT DOCUMENTS

| CN | 103648088 A | 3/2014 |
|---|---|---|
| CN | 108632882 A | 10/2018 |

(Continued)

OTHER PUBLICATIONS

Ericsson, Session—TMBR for POU session in W-5GAN, 20 pages, 3GPP TSG CT WG1 Meeting #116, C1-192013, Apr. 12, 2019 (Year: 2019).*

(Continued)

*Primary Examiner* — Mounir Moutaouakil
(74) *Attorney, Agent, or Firm* — Fish & Richardson P.C.

(57) ABSTRACT

In a communication method, the method includes: receiving a first AMBR of a slice, where the first AMBR indicates a quantity of GBR resources and a quantity of non-GBR resources in the slice, and the first AMBR is a subscribed slice AMBR or an authorized slice AMBR; determining a second AMBR of the slice based on the first AMBR, a session-AMBR of an activated PDU session of the slice, and a flow control bit rate of a QoS flow of the activated PDU session of the slice, where the flow control bit rate is a GFBR or an MFBR; and performing traffic control on the slice based on the second AMBR. The AMBR of the slice may indicate a quantity of GBR resources and a quantity of non-GBR resources in the slice.

20 Claims, 7 Drawing Sheets

(56) References Cited

U.S. PATENT DOCUMENTS

| | | | |
|---|---|---|---|
| 2014/0169299 A1 | 6/2014 | Wang et al. | |
| 2018/0014222 A1 | 1/2018 | Song et al. | |
| 2018/0014353 A1 | 1/2018 | Pao et al. | |
| 2018/0249373 A1* | 8/2018 | Castro Castro | H04W 24/08 |
| 2019/0320362 A1* | 10/2019 | Liu | H04W 28/0263 |
| 2021/0105191 A1* | 4/2021 | Yang | G06F 11/3409 |
| 2021/0127297 A1* | 4/2021 | Wang | H04W 28/082 |
| 2022/0418013 A1* | 12/2022 | Yu | H04W 76/15 |

FOREIGN PATENT DOCUMENTS

| | | | |
|---|---|---|---|
| CN | 108811000 A | 11/2018 | |
| CN | 109392013 A | 2/2019 | |
| CN | 109392042 A | 2/2019 | |
| EP | 3824613 B1 * | 7/2024 | H04L 12/1407 |

OTHER PUBLICATIONS

Telstra, Extension of the QoS model for wireline access, 7 pages, 3GPP, SA WG2 Meeting #131, S2-1901895, Mar. 1, 2019 (Year: 2019).*

3GPP TS 23.503 V16.2.0, "3rd Generation Partnership Project; Technical Specification Group Services and System Aspects; Policy and Charging Control Framework for the 5G System (5GS); Stage 2 (Release 16)," Sep. 2019, 104 pages.

Extended European Search Report issued in European Application No. 19951000.9 on Aug. 23, 2022, 7 pages.

Huawei, HiSilicon, "QoS Parameters," 3GPP TSG-RAN WG2 Meeting #98, R2-1704976, Hangzhou, China, May 15-19, 2017, 3 pages.

LG Electronics Inc., "UE-AMBR derivation in RAN," 3GPP TSG-RAN WG3 Meeting #97, R3-173006, Berlin, Germany, Aug. 21-25, 2017, 21 pages.

3GPP TS 23.501 V15.6.0 (Jun. 2019), "3rd Generation Partnership Project; Technical Specification Group Services and System Aspects; System Architecture for the 5G System; Stage 2 (Release 15)," Jun. 2019, 243 pages.

3GPP TS 23.501 V16.2.0 (Sep. 2019), "3rd Generation Partnership Project; Technical Specification Group Services and System Aspects; System Architecture for the 5G System (5GS); Stage 2 (Release 16)," Sep. 2019, 391 pages.

3GPP TS 23.502 V15.6.0 (Jun. 2019), "3rd Generation Partnership Project; Technical Specification Group Services and System Aspects; Procedures for the 5G System; Stage 2 (Release 15)," Jun. 2019, 357 pages.

Nokia, "PDU Session AMBR," 3GPP TSG-RAN WG2 Meeting #104, R2-1819128, Spokane, USA, Nov. 12-16, 2018, 4 pages.

PCT International Search Report and Written Opinion issued in International Application No. PCT/CN2019/114797 on Jul. 31, 2020, 14 pages (with English translation).

* cited by examiner

COMMUNICATION METHOD, APPARATUS, AND SYSTEM

CROSS-REFERENCE TO RELATED APPLICATIONS

This application is a continuation of International Patent Application No. PCT/CN2019/114797, filed on Oct. 31, 2019, which is hereby incorporated by reference in its entirety.

TECHNICAL FIELD

This application relates to the field of communication technologies, and in particular, to a communication method, apparatus, and system.

BACKGROUND

To maximize bandwidth utilization of a system, a concept of aggregation is introduced, and an aggregated maximum bit rate (AMBR) parameter is defined. An AMBR can be used by an operator to limit a total rate of a subscriber.

In the latest standard progress, traffic (where the traffic may be uplink traffic or downlink traffic) of a single terminal device in a slice needs to be controlled. However, there is no corresponding method currently.

SUMMARY

This application provides a communication method, apparatus, and system, to perform traffic control based on an AMBR of a slice, thereby improving accuracy of performing traffic control.

According, to a first aspect, this application provides a communication method. The method includes: receiving a first AMBR of a slice, where the first AMBR is used to indicate a quantity of GBR resources and a quantity of non-GBR resources in the slice, and the first AMBR is a subscribed slice AMBR or an authorized slice AMBR; determining a second AMBR of the slice based on the first AMBR, a session-AMBR of a PDU session of the slice, and a flow control bit rate of a QoS flow of an activated PDU session of the slice, where the flow control bit rate is a GFBR or an MFBR; and performing traffic control on the slice based on the second AMBR.

Based on the foregoing solution, an implementation method for performing traffic control based on an AMBR of a slice is provided. The AMBR of the slice may be used to indicate a quantity of GBR resources and a quantity of non-GBR resources in the slice. This helps improve accuracy of performing traffic control.

In a possible implementation method, the first AMBR is equal to a sum of the quantity of GBR resources and the quantity of non-GBR resources in the slice; and the determining a second AMBR of the slice based on the first AMBR, a session-AMBR of an activated PDU session of the slice, and a flow control bit rate of a QoS flow of the activated PDU session of the slice includes: determining that the second AMBR is the smaller one of the first AMBR and a sum of the flow control bit rate of the QoS flow of the activated PDU session of the slice and the session-AMBR of the activated PDU session of the slice.

In a possible implementation method, the second AMBR is used to indicate a maximum value of a quantity of resources allowed to be used in the slice.

In a possible implementation method, the performing traffic control on the slice based on the second AMBR includes: if a quantity of GBR resources requested to be allocated to a first QoS flow is greater than a difference between the second AMBR and a quantity of resources currently occupied by the slice, rejecting allocation of a GBR resource to the first QoS flow; if a quantity of GBR resources requested to be allocated to a first QoS flow is less than or equal to a difference between the second AMBR and a quantity of resources currently occupied by the slice, determining to allocate a GBR resource to the first QoS flow; or if actual traffic of the slice is greater than the second AMBR, discarding a data packet of a PDU session of the slice.

In a possible implementation method, the first AMBR includes the quantity of GBR resources and the quantity of non-GBR resources; and the determining a second AMBR of the slice based on the first AMBR, a session-AMBR of an activated PDU session of the slice, and a flow control bit rate of a QoS flow of the activated PDU session of the slice includes: determining that a quantity of GBR resources in the second AMBR is the smaller one of the flow control bit rate of the QoS flow of the activated PDU session of the slice and the quantity of GBR resources in the first AMBR; and determining that a quantity of non-GBR resources in the second AMBR is the smaller one of the session-AMBR of the activated PDU session of the slice and the quantity of non-GBR resources in the first AMBR.

In a possible implementation method, the quantity of GBR resources in the second AMBR is used to indicate a maximum value of a quantity of GBR resources allowed to be used in the slice; and the quantity of non-GBR resources in the second AMBR is used to indicate a maximum value of a quantity of non-GBR resources allowed to be used in the slice.

In a possible implementation method, the performing traffic control on the slice based on the second AMBR includes: if a quantity of GBR resources requested to be allocated to a first QoS flow is greater than a difference between the quantity of GBR resources in the second AMBR and a quantity of GBR resources currently occupied by the slice, rejecting allocation of a GBR resource to the first QoS flow; if a quantity of GBR resources requested to be allocated to a first QoS flow is less than or equal to a difference between the quantity of GBR resources in the second AMBR and a quantity of GBR resources currently occupied by the slice, determining to allocate a GBR resource to the first QoS flow; or if actual traffic of the slice is greater than the quantity of non-GBR resources in the second AMBR, discarding a data packet of a PDU session of the slice.

According to a second aspect, this application provides a communication method. The method includes: obtaining a subscribed AMBR of a slice, where the subscribed AMBR is used to indicate a quantity of GBR resources and a quantity of non-GBR resources in the slice; determining policy information based on the subscribed AMBR, where the policy information includes at least one of a session-AMBR of a PDU session or a flow control bit rate of a QoS flow of a PDU session; and sending the policy information to a session management network element.

Based on the foregoing solution, an implementation method for performing traffic control based on an AMBR of a slice is provided. The AMBR of the slice may be used to indicate a quantity of GBR resources and a quantity of non-GBR resources in the slice. This helps improve accuracy of performing traffic control.

In a possible implementation method, the subscribed AMBR is equal to a sum of the quantity of GBR resources and the quantity of non-GBR resources in the slice; or the subscribed AMBR includes the quantity of GBR resources in the slice and the quantity of non-GBR resources in the slice.

In a possible implementation method, an authorized AMBR of the slice is received from the session management network element, where the authorized AMBR is from a visited policy control network element; and the determining policy information based on the subscribed AMBR includes: determining the policy information based on the subscribed. AMBR and the authorized AMBR.

In a possible implementation method, a first request from an application function network element is received, where the first request includes a QoS requirement; and whether to allocate a GBR resource or a non-GBR resource to the application function network element is determined based on the policy information.

According to a third aspect, this application provides a communication apparatus. The apparatus may be an access network device, or may be a chip used in the access network device. The apparatus has a function of implementing the first aspect or the embodiments of the first aspect. The function may be implemented by using hardware, or may be implemented by hardware executing corresponding software. The hardware or the software includes one or more modules corresponding to the foregoing function.

According to a fourth aspect, this application provides a communication apparatus. The apparatus may be a policy control network element, or may be a chip used in the policy control network element. The apparatus has a function of implementing the second aspect or the embodiments of the second aspect. The function may be implemented by using hardware, or may be implemented by hardware executing corresponding software. The hardware or the software includes one or more modules corresponding to the foregoing function.

According to a fifth aspect, this application provides a communication apparatus, including a processor and a memory. The memory is configured to store computer-executable instructions. When the apparatus runs, the processor executes the computer-executable instructions stored in the memory, to enable the apparatus to perform the method in the foregoing aspects or the embodiments of the foregoing aspects.

According to a sixth aspect, this application provides a communication apparatus, including units or means configured to perform the foregoing aspects or the steps in the foregoing aspects.

According to a seventh aspect, this application provides a communication apparatus, including a processor and an interface circuit. The processor is configured to communicate with another apparatus through the interface circuit, and perform the methods in the foregoing aspects or the embodiments of the foregoing aspects. There are one or more processors.

According to an eighth aspect, this application provides a communication apparatus, including a processor, configured to be connected to a memory, and invoke a program stored in the memory, to perform the methods in the foregoing aspects or the embodiments of the foregoing aspects. The memory may be located inside the apparatus, or may be located outside the apparatus. In addition, there are one or more processors.

According to a ninth aspect, this application further provides a computer-readable storage medium. The computer-readable storage medium stores instructions. When the instructions are run on a computer, a processor is enabled to perform the methods in the foregoing aspects or the embodiments of the foregoing aspects.

According to a tenth aspect, this application further provides a computer program product including instructions. When the computer program product runs on a computer, the computer is enabled to perform the methods in the foregoing aspects or the embodiments of the foregoing aspects.

According to an eleventh aspect, this application further provides a chip system, including a processor, configured to perform the methods in the foregoing aspects or the embodiments of the foregoing aspects.

According to a twelfth aspect, this application further provides a communication system, including a mobility management network element and an access network device. The mobility management network element is configured to send a first AMBR of a slice to the access network device, where the first AMBR is used to indicate a quantity of GBR resources and a quantity of non-GBR resources in the slice, and the first AMBR is a subscribed slice AMBR or an authorized slice AMBR. The access network device is configured to: determine a second AMBR of the slice based on the first AMBR, a session-AMBR of an activated PDU session of the slice, and a flow control bit rate of a QoS flow of the activated PDU session of the slice, where the flow control bit rate is a GFBR or an MFBR; and perform traffic control on the slice based on the second AMBR.

According to a thirteenth aspect, this application further provides a communication method, including:

A mobility management network element sends a first AMBR of a slice to an access network device, where the first AMBR is used to indicate a quantity of GBR resources and a quantity of non-GBR resources in the slice, and the first AMBR is a subscribed slice AMBR or an authorized slice AMBR;

the access network device determines a second AMBR of the slice based on the first AMBR, a session-AMBR of an activated PDU session of the slice, and a flow control bit rate of a QoS flow of the activated PDU session of the slice, where the flow control bit rate is a GFBR or an MFBR; and the access network device performs traffic control on the slice based on the second AMBR.

DESCRIPTION OF EMBODIMENTS

To make the objectives, technical solutions, and advantages of this application clearer, the following further describes this application in detail with reference to the accompanying drawings. A specific operation method in a method embodiment may also be applied to an apparatus embodiment or a system embodiment. In descriptions of this application, unless otherwise noted, a meaning of "a plurality of" is two or more.

Figure 1:
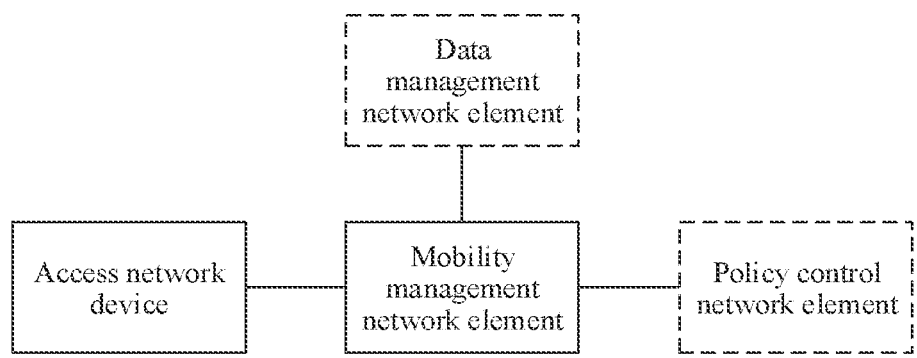
FIG. 1 is a schematic diagram of a communication system according to this application.

To resolve a problem mentioned in the background, as shown in FIG. 1, this application provides a communication system. The system includes a mobility management network element and an access network device. Optionally, the system may further include a data management network element and a policy control network element.

The mobility management network element is configured to send a first AMBR of a slice to the access network device, where the first AMBR is used to indicate a quantity of GBR resources and a quantity of non-GBR resources in the slice, and the first AMBR is a subscribed slice AMBR or an authorized slice AMBR. The access network device is configured to: determine a second AMBR of the slice based on the first AMBR, a session-AMBR of an activated protocol data unit PDU session of the slice, and a flow control bit rate of a QoS flow of the activated PDU session of the slice, where the flow control bit rate is a GFBR or an MFBR; and perform traffic control on the slice based on the second AMBR.

In a possible implementation method, the first AMBR is equal to a sum of the quantity of GBR resources and the quantity of non-GBR resources in the slice; and that the access network device is configured to determine a second AMBR of the slice based on the first AMBR, a session-AMBR of an activated PDU session of the slice, and a flow control bit rate of a QoS flow of the activated PDU session of the slice specifically includes: determining that the second AMBR is the smaller one of the first AMBR and a sum of the flow control bit rate of the QoS flow of the activated PDU session of the slice and the session-AMBR of the activated PDU session of the slice.

The implementation method may be understood as follows: The second AMBR is set to the sum of the flow control bit rate of the QoS flow of the activated PDU session of the slice and the session-AMBR of the activated PDU session of the slice, but a maximum value of the second AMBR does not exceed the first AMBR.

Alternatively, the implementation method may be understood as follows: The second AMBR is set based on the flow control bit rate of the QoS flow of the activated PDU session of the slice and the session-AMBR of the activated PDU session of the slice, but a maximum value of the second AMBR does not exceed the first AMBR.

In a possible implementation method, the second AMBR is used to indicate a maximum value of a quantity of resources allowed to be used in the slice.

In a possible implementation method, that the access network device is configured to perform traffic control on the slice based on the second AMBR specifically includes: if a quantity of GBR resources requested to be allocated to a first QoS flow is greater than a difference between the second AMBR and a quantity of resources currently occupied by the slice, rejecting allocation of a GBR resource to the first QoS flow; if a quantity of GBR resources requested to be allocated to a first QoS flow is less than or equal to a difference between the second AMBR and a quantity of resources currently occupied by the slice, determining to allocate a GBR resource to the first QoS flow; or if actual traffic of the slice is greater than the second AMBR, discarding a data packet of a PDU session of the slice.

In a possible implementation method, the first AMBR includes the quantity of GBR resources and the quantity of non-GBR resources; and that the access network device is configured to determine a second AMBR of the slice based on the first AMBR, a session-AMBR of an activated PDU session of the slice, and a flow control bit rate of a QoS flow of the activated PDU session of the slice specifically includes: determining that a quantity of GBR resources in the second AMBR is the smaller one of the flow control bit rate of the QoS flow of the activated PDU session of the slice and the quantity of GBR resources in the first AMBR; and determining that a quantity of non-GBR resources in the second AMBR is the smaller one of the session-AMBR of the activated PDU session of the slice and the quantity of non-GBR resources in the first AMBR.

The implementation method may be understood as follows: The quantity of GBR resources in the second AMBR is set to the flow control hit rate of the QoS flow of the activated PDU session of the slice, but a maximum value does not exceed the quantity of GBR resources in the first AMBR. The quantity of non-GBR resources in the second AMBR is set to the session-AMBR of the activated PDU session of the slice, but a maximum value does not exceed the quantity of non-GBR resources in the first AMBR.

Alternatively, the implementation method may be understood as follows: The quantity of GBR resources in the second AMBR is set based on the flow control bit rate of the QoS flow of the activated PDU session of the slice, but a maximum value does not exceed the quantity of GBR resources in the first AMBR. The quantity of non-GBR resources in the second AMBR is set based on the session-AMBR of the activated PDU session of the slice, but a maximum value does not exceed the quantity of non-GBR resources in the first AMBR.

In a possible implementation method, the quantity of GBR resources in the second AMBR is used to indicate a maximum value of a quantity of GBR resources allowed to be used in the slice; and the quantity of non-GBR resources in the second AMBR is used to indicate a maximum value of a quantity of non-GBR resources allowed to be used in the slice.

In a possible implementation method, that the access network device is configured to perform traffic control on the slice based on the second AMBR specifically includes: if a quantity of GBR resources requested to be allocated to a first QoS flow is greater than a difference between the quantity of GBR resources in the second AMBR and a quantity of GBR resources currently occupied by the slice, rejecting allocation of a GBR resource to the first QoS flow; if a quantity of GBR resources requested to be allocated to a first QoS flow is less than or equal to a difference between the quantity of GBR resources in the second AMBR and a quantity of GBR resources currently occupied by the slice, determining to allocate a GBR resource to the first QoS flow; or if actual traffic of the slice is greater than the quantity of non-GBR resources in the second AMBR, discarding a data packet of a PDU session of the slice.

In a possible implementation method, the mobility management network element is further configured to obtain a subscribed AMBR of the slice from the data management network element.

In a possible implementation method, the mobility management network element is further configured to send the subscribed AMBR of the slice to the policy control network element; and the policy control network element is configured to: perform authorization on the subscribed AMBR of the slice to obtain an authorized AMBR of the slice, and send the authorized AMBR of the slice to the mobility management network element.

Figure 2:
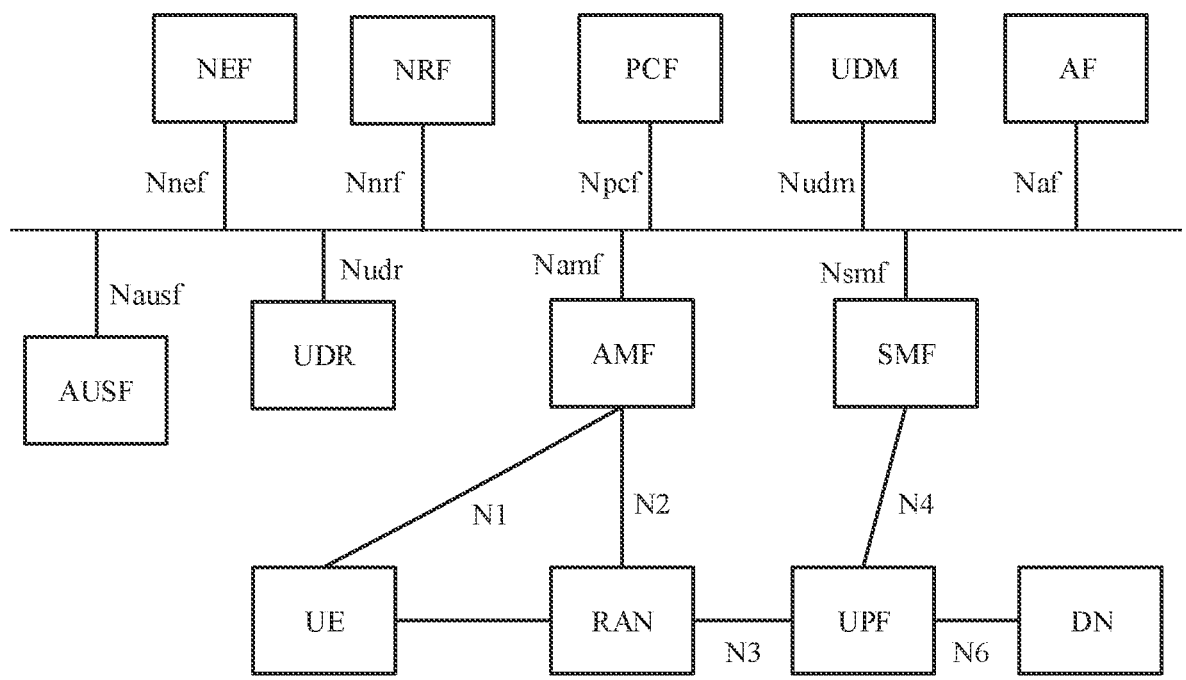
FIG. 2 is a schematic diagram of a 5G network architecture based on a service-oriented architecture.

FIG. 2 is a schematic diagram of a 5th generation (5G) network architecture based on a service-oriented architecture. The 5G network architecture shown in FIG. 2 may include three parts: a terminal device, a data network (DN), and an operator network. The following briefly describes functions of some network elements.

The operator network may include one or more of the following network elements: an authentication server function (AUSF) network element, a network exposure function (NEF) network element, a policy control function (PCF) network element, a unified data management (UDM) network element, a unified data repository (UDR), a network repository function (NRF) network element, an application function (AF) network element, an access and mobility management function (AMF) network element, a session management function (SMF) network element, a radio access network (RAN), a user plane function (UPF) network element, and the like. In the foregoing operator network, parts other than the radio access network may be referred to as a core network.

The terminal device, which may also be referred to as user equipment (UE), is a device that has a wireless transceiver function. The terminal device may be deployed on land, and includes an indoor or outdoor device, a handheld device, or a vehicle-mounted device; may be deployed on water (for example, on a ship); or may be deployed in air (for example, on an airplane, a balloon, or a satellite). The terminal device may be a mobile phone, a tablet computer (pad), a computer that has a wireless transceiver function, a virtual reality (VR) terminal, an augmented reality (AR) terminal, a wireless terminal in industrial control, a wireless terminal in self-driving, a wireless terminal in telemedicine, a wireless terminal in a smart grid, a wireless terminal in transportation safety, a wireless terminal in a smart city, a wireless terminal in a smart home, or the like. The terminal device herein refers to a 3rd generation partnership project (3GPP) terminal.

The terminal device may establish a connection to the operator network through an interface (for example, N1) provided by the operator network, and use services such as a data service and/or a voice service provided by the operator network. The terminal device may further access the DN through the operator network, and use an operator service deployed on the DN and/or a service provided by a third party. The third party may be a service provider other than the operator network and the terminal device, and may provide other services such as a data service and/or a voice service for the terminal device. A specific representation form of the third party may be specifically determined based on an actual application scenario, and is not limited herein.

The RAN is a sub-network of the operator network, and is an implementation system between a service node in the operator network and the terminal device. To access the operator network, the terminal device first passes through the RAN, and may be connected to the service node of the operator network through the RAN. A RAN device in this application is a device that provides a wireless communication function for a terminal device, and the RAN device is also referred to as an access network device. The RAN device in this application includes but is not limited to: a next generation NodeB (gNB) in 5G, an evolved NodeB (eNB), a radio network controller (RNC), a NodeB (NB), a base station controller (BSC), a base transceiver station (BTS), a home NodeB (for example, a home evolved NodeB or a home NodeB, HNB), a baseband unit (BBU), a transmission reception point (TRP), a transmitting point (TP), a mobile switching center, and the like.

The AMF network element mainly performs functions such as mobility management, and access authentication/authorization. In addition, the AMF network element is further responsible for transferring user policies between the UE and the PCF.

The SMF network element mainly performs functions such as session management, execution of a control policy delivered by the PCF, UPF selection, and UE internet protocol (IP) address allocation.

The UPF network element serves as an interface UPF with the data network, and implements functions such as user plane data forwarding, session/flow-based charging statistics, and bandwidth limitation.

The UDM network element is mainly responsible for functions such as subscription data management and user access authorization.

The UDR is mainly responsible for a function of accessing various types of data such as subscription data, policy data, and application data.

The NET network element is mainly configured to support capability and event exposure.

The AF network element mainly transfers a requirement of an application side on a network side, for example, a quality of service (QoS) requirement or user status event subscription. The AF may be a third-party functional entity, or may be an application service, for example, an IP multimedia subsystem (IMS) voice call service, deployed by an operator.

The PCF network element is mainly responsible for policy control functions such as session-level or service flow-level charging, QoS bandwidth guarantee and mobility management, and UE policy decision. In this architecture, PCFs connected to the AMF and the SMF correspond to an AM PCF (PCF for Access and Mobility Control) and an SM PCF (PCF for Session Management). In an actual deployment scenario, the PCFs may not be a same PCF entity.

The NRF network element may be configured to provide a network element discovery function and provide network element information corresponding to a network element type based on a request from another network element. The NRF further provides a network element management service, for example, registration, update, and deregistration of a network element and subscription and push of a network element status.

The AUSF network element is mainly responsible for authenticating a user, to determine whether to allow the user or a device to access a network.

The DN is a network outside the operator network. The operator network may access a plurality of DNs. A plurality of services may be deployed on the DN, and the DN may provide services such as a data service and/or a voice service for the terminal device. For example, the DN is a private network of a smart factory, a sensor installed in a workshop of the smart factory may be a terminal device, a control server of the sensor is deployed in the DN, and the control server may provide a service for the sensor. The sensor may communicate with the control server, to obtain an instruction of the control server, transmit collected sensor data to the control server based on the instruction, and so on. For another example, the DN is an internal office network of a company, a mobile phone or a computer of an employee of the company may be a terminal device, and the mobile phone or the computer of the employee may access information, data resources, and the like on the internal office network of the company.

In FIG. 2, Nausf, Nnef, Npcf, Nudm, Naf, Namf, Nsmf, N1, N2, N3, N4, and N6 are interface serial numbers. For meanings of these interface serial numbers, refer to definitions in 3GPP specifications. No limitation is imposed herein.

Figure 3:
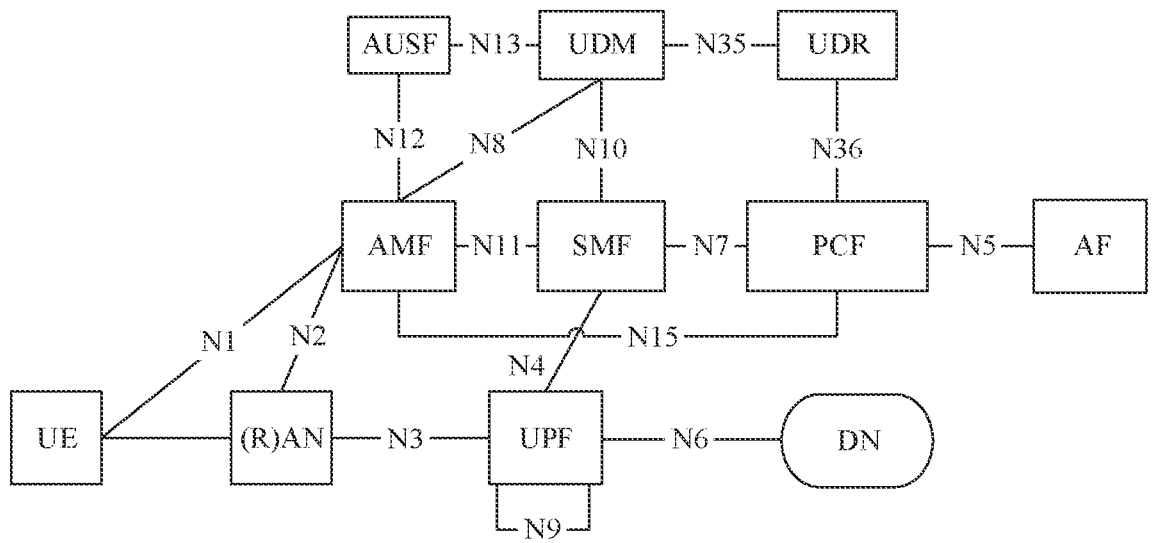
FIG. 3 is a schematic diagram of a 5G network architecture based on a point-to-point interface.

FIG. 3 is a schematic diagram of a 5G network architecture based on a point-to-point interface. For descriptions of functions of network elements in FIG. 3, refer to descriptions of functions of corresponding network elements in FIG. 2. Details are not described again. A main difference between FIG. 3 and FIG. 2 lies in that interfaces between the network elements in FIG. 3 are point-to-point interfaces rather than service-oriented interfaces.

In the architecture shown in FIG. 3, names and functions of the interfaces between the network elements are as follows:

(1) N7 represents an interface between the PCF and the SMF, and is configured to deliver a protocol data unit (PDU) session granularity control policy and a service data flow granularity control policy.

(2) N15 represents an interface between the PCF and the AMF, and is configured to deliver a UE policy and an access control related policy.

(3) N5 represents an interface between the AF and the PCF, and is configured to deliver an application service request and report a network event.

(4) N4 represents an interface between the SMF and the UPF, and is configured to transfer information between a control plane and a user plane, including delivery of forwarding rules, QoS control rules, traffic statistics rules, and the like from the control plane to the user plane, and reporting of user plane information.

(5) N11 represents an interface between the SMF and the AMF, and is configured to: transfer PDU session tunnel information between the RAN and the UPF, transfer a control message to be sent to the UE, transfer radio resource control information to be sent to the RAN, and so on.

(6) N2 represents an interface between the AMF and the RAN, and is configured to transfer radio bearer control information and the like from a core network side to the RAN.

(7) N1 represents an interface between the AMF and the UE, is access-irrelevant, and is configured to transfer the QoS control rule and the like to the UE.

(8) N8 represents an interface between the AMF and the UDM, and is used by the AMF to obtain, from the UDM, subscription data and authentication data related to access and mobility management, and used by the AMF to register current mobility management related information of the UE with the UDM.

(9) N10 represents an interface between the SMF and the UDM, and is used by the SMF to obtain, from the UDM, subscription data related to session management, and used by the SMF to register current session related information of the UE with the UDM.

(10) N35 represents an interface between the UDM and the UDR, and is used by the UDM to obtain user subscription data information from the UDR.

(11) N36 represents an interface between the PCF and the UDR, and is used by the PCF to obtain policy related subscription data and application data related information from the UDR.

(12) N12 represents an interface between the AMF and the AUSF, and is used by the AMF to initiate an authentication procedure to the AUSF, where an SUCI may be carried as a subscription identifier; and

(13) N13 represents an interface between the UDM and the AUSF, and is used by the AUSF to obtain a user authentication vector from the UDM, to perform an authentication procedure.

It may be understood that the network elements or the functions may be network elements in a hardware device, software functions run on dedicated hardware, or vitalized functions instantiated on a platform (for example, a cloud platform). Optionally, the network elements or the functions may be implemented by one device, or may be jointly implemented by a plurality of devices, or may be one function module in one device. This is not specifically limited in embodiments of this application.

In this application, a mobility management network element, a session management network element, a policy control network element, an application function network element, an access network device, and a data management network element may respectively be the AMF, the SMF, the PCF, the AF, the RAN, and the UDM in FIG. 2 or FIG. 3; or may be network elements that have functions of the AMF, the SMF, the PCF, the AF, the RAN, and the UDM in a future communication network such as a 6th generation (6G) network. This is not limited in this application. For ease of description, an example in which the mobility management network element, the session management network element, the policy control network element, the application function network element, the access network device, and the data management network element are respectively the AMF, the SMF, the PCF, the AF, the RAN, and the UDM is used in this application for description. Further, a terminal device is referred to as UE for short in this application.

For ease of understanding of the solutions of this application, the following first describes related background technologies.

1. 5G QoS Model (or 5G QoS Framework)

In a 5G system, to ensure end-to-end quality of service of a service, a 5G QoS model based on a QoS flow is proposed. The 5G QoS model supports a guaranteed bit rate (GBR) QoS flow and a non-guaranteed bit rate (Non-GBR) QoS flow. Same transmission processing (such as scheduling or an admission threshold) is performed on data packets controlled by using a same QoS flow.

A GBR means that a bit rate required for a bearer is "permanently" allocated by a network, and a corresponding bit rate can be maintained even if network resources are insufficient. A maximum bit rate (MBR) parameter defines an upper limit of a rate that can be reached when resources for a GBR bearer are sufficient. A value of the MBR may be greater than or equal to a value of the GBR. On the contrary, a non-GBR means that a service (or a bearer) needs to experience a rate reduction in the case of network congestion. A non-GBR bearer can be set up for a long time because the non-GBR bearer does not need to occupy a fixed network resource. However, the GBR bearer is generally set up only when required.

The UE may establish one or more PDU sessions with a 5G network. One or more QoS flows can be established in each PDU session. Each QoS flow is identified by a QoS flow identifier (QFI), and the QFI uniquely identifies a QoS flow in a session.

Whether a QoS flow is a GBR QoS flow or a non-GBR QoS flow is determined by a corresponding QoS profile.

For the GBR QoS flow, a corresponding QoS profile includes the following QoS parameters: a 5G QoS identifier (5QI), an allocation and reservation priority (ARP), a guaranteed flow bit rate, and a maximum flow bit rate (MFBR). Optionally, the QoS profile may further include notification control. GBR QoS flows are classified, depending on whether profiles include notification control, into a GBR QoS flow that requires notification control and a GBR QoS flow that does not require notification control. For the GBR QoS flow that requires notification control, when a RAN detects that a corresponding QoS flow resource requirement cannot be met, the RAN notifies an SMF of the event. Further, the SMF may initiate a QoS flow deletion or modification procedure.

For the non-GBR QoS flow, a corresponding QoS profile includes the following QoS parameters: a 5QI and an ARP. Optionally, the QoS profile may further include a reflective QoS attribute (RQA).

Meanings of the QoS parameters mentioned above are described as follows:

5QI: The 5QI is a scalar to be indexed to a corresponding 5G QoS characteristic. 5QIs are classified into a standardized 5QI, a preconfigured 5QI, and a dynamically allocated 5QI. The standardized 5QI is in one-to-one correspondence with a group of standardized 5G QoS characteristic values. A 5G QoS characteristic value corresponding to the preconfigured 5QI is preconfigured in the RAN. A 5G QoS characteristic corresponding to the dynamically allocated 5QI is included in a QoS profile and sent to the RAN.

ARP: The ARP includes a priority level, a preemption capability, and a preemption vulnerability.

RQA: The RQA is used to indicate a service transmitted by using a corresponding QoS flow to use reflective QoS.

Notification control: The notification control is used to indicate whether the RAN notifies a network during use of the QoS flow when the GFBR cannot be met.

GFBR: The GFBR represents a bit rate that is expected to be provided for the GBR QoS flow.

MFBR: The MFBR is used to limit a bit rate provided for the GBR QoS flow, namely, a maximum bit rate provided for the GBR QoS flow. If the bit rate is exceeded, a data packet can be discarded.

2. AMBR

To maximize bandwidth utilization of a system, a concept of aggregation is introduced, and an AMBR parameter is defined. An AMBR can be used by an operator to limit a total rate of a subscriber. AMBRs may include a UE-AMBR, a session-AMBR, and the like. The UE-AMBR defines an AMBR of each subscriber and is used to indicate a quantity of non-GBR resources that can be used by one UE. The session-AMBR defines an AMBR of a session and limits a quantity of non-GBR resources that can be used by one PDU session of one UE.

In the latest standard progress, traffic (where the traffic may be uplink traffic or downlink traffic) of a single UE in a slice needs to be controlled. However, there is no corresponding method currently.

Figure 4:
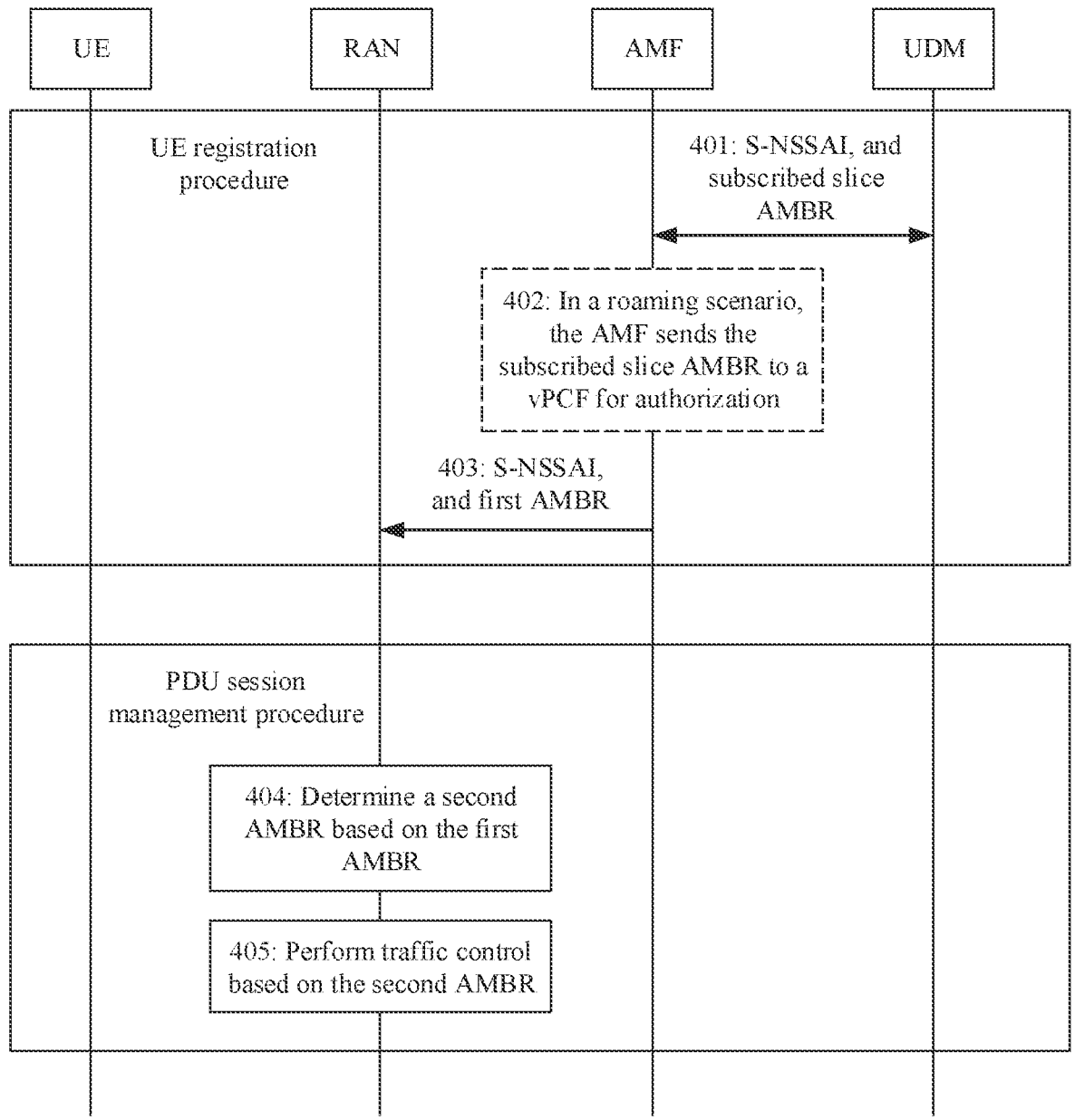
FIG. 4 is a schematic flowchart of a communication method according to this application.

To resolve the foregoing problem, based on the network architecture shown in FIG. 2 or FIG. 3, as shown in FIG. 4, this application provides a communication method. On an access network device side, the method may be performed by a RAN or a component (such as a chip or a circuit) used in the RAN. On a network side, the method may be performed by an AMF or a UDM, or a component (such as a chip or a circuit) used in the AMF or the UDM. The following uses an example in which UE, the AMF, and the UDM perform the method for description.

The method includes the following steps.

Step 401: In a UE registration procedure, the AMF obtains, from the UDM, a slice identifier and a subscribed slice AMBR corresponding to the slice identifier.

Optionally, the AMF may obtain, from the UDM by invoking a service Nudm_SDM_Get of the UDM, the slice identifier and the subscribed slice AMBR corresponding to the slice identifier.

There may be one or more slice identifiers herein, and one slice identifier corresponds to one subscribed slice AMBR. The slice identifier may be, for example, single network slice selection assistance information (S-NSSAI).

It should be noted that all slice identifiers herein are S-NSSAI in a home public land mobile network (hPLMN).

The subscribed slice AMBR is used to indicate a quantity of subscribed GBR resources and a quantity of subscribed non-GBR resources in a slice. The subscribed slice AMBR herein may be implemented by using at least the following two methods.

Implementation method 1: The subscribed slice AMBR indicates a sum of the quantity of subscribed GBR resources and the quantity of subscribed non-GBR resources in the slice.

The quantity of subscribed GBR resources in the slice may also be expressed as a maximum quantity of subscribed GBR resources in the slice, and the quantity of subscribed non-GBR resources in the slice may also be expressed as a maximum quantity of subscribed non-GBR resources in the slice. The meaning also applies to the following descriptions, and details are not described again.

In the implementation method, a quantity of GBR resources and a quantity of non-GBR resources are not distinguished, but a slice AMBR is used to indicate a sum of the quantity of subscribed GBR resources and the quantity of subscribed non-GBR resources in the slice. That is, the slice AMBR indicates an aggregated maximum uplink and/or downlink bit rate, to which a subscriber subscribes, for all GBR QoS flows and non-GBR QoS flows in the slice for the subscriber.

In an example, the obtained subscribed slice AMBR includes: {S-NSSAI 1, slice-AMBR 1} and {S-NSSAI 2, slice-AMBR 2}.

The slice-AMBR 1 indicates a sum of a quantity of subscribed GBR resources and a quantity of subscribed non-GBR resources in a slice identified by the S-NSSAI 1. The slice-AMBR 2 indicates a sum of a quantity of subscribed GBR resources and a quantity of subscribed non-GBR resources in a slice identified by the S-NSSAI 2.

Implementation method 2: The subscribed slice AMBR includes the quantity of subscribed GBR resources and the quantity of subscribed non-GBR resources in the slice.

That is, the subscribed slice AMBR includes two parts: the quantity of subscribed GBR resources in the slice and the quantity of subscribed non-GBR resources in the slice. The quantity of subscribed GBR resources in the slice indicates an aggregated maximum uplink and/or downlink bit rate, to which a subscriber subscribes, for all GBR QoS flows in the slice for the subscriber. The quantity of subscribed non-GBR resources in the slice indicates an aggregated maximum uplink and/or downlink bit rate, to which the subscriber subscribes, for all non-GBR QoS flows in the slice for the subscriber.

In an example, the obtained subscribed slice AMBR includes: {S-NSSAI 1, quantity of GBR resources: slice-AMBR 11, quantity of non-GBR resources: slice-AMBR 12} and {S-NSSAI 2, quantity of GBR resources: slice-AMBR 21, quantity of non-GBR resources: slice-AMBR 22}.

The slice-AMBR 11 indicates a quantity of GBR resources in a slice identified by the S-NSSAI 1. The slice-AMBR 12 indicates a quantity of non-GBR resources in the slice identified by the S-NSSAI 1. The slice-AMBR 21 indicates a quantity of GBR resources in a slice identified by the S-NSSAI 2. The slice-AMBR 22 indicates a quantity of non-GBR resources in the slice identified by the S-NSSAI 2.

In a roaming scenario, the method may further include the following step 402.

Step 402: In the roaming scenario, the AMF sends the subscribed slice AMBR to a vPCF for authorization.

That is, when the UE performs access from a visited public land mobile network (vPLMN), the AMF sends the subscribed slice AMBR obtained from the UDM to the vPCF for authorization. The vPCF sends an authorized slice AMBR to the AMF.

The authorized slice AMBR may be greater than the subscribed slice AMBR, may be equal to the subscribed slice AMBR, or may be less than the subscribed slice AMBR. This is not limited in this application.

It should be noted that, if the subscribed slice AMBR corresponds to the foregoing implementation method 1, the authorized slice AMBR also corresponds to the foregoing implementation method 1, that is, the authorized slice AMBR indicates a sum of a quantity of authorized GBR resources and a quantity of authorized non-GBR resources in the slice. The quantity of authorized GBR resources in the slice may also be expressed as a maximum quantity of authorized GBR resources in the slice, and the quantity of authorized non-GBR resources in the slice may also be expressed as a maximum quantity of authorized non-GBR resources in the slice. The meaning also applies to the following descriptions, and details are not described again.

If the subscribed slice AMBR corresponds to the foregoing implementation method 2, the authorized slice AMBR also corresponds to the foregoing implementation method 2, that is, the authorized slice AMBR includes two parts: the quantity of authorized GBR resources in the slice and the quantity of authorized non-GBR resources in the slice.

Step 403: The AMF sends the slice identifier and a first AMBR corresponding to the slice identifier to the RAN. Correspondingly, the RAN may receive the slice identifier and the first AMBR corresponding to the slice identifier.

Optionally, the AMF may send the slice identifier and a slice AMBR corresponding to the slice identifier to the RAN by using an N2 message.

The first AMBR herein is used to indicate a quantity of GBR resources and a quantity of non-GBR resources in the slice. In a non-roaming scenario, the first AMBR may be the subscribed slice AMBR obtained from the UDM. Alternatively, in the roaming scenario, the first AMBR herein refers to the authorized slice AMBR obtained from the visited PCF.

Step 404: The RAN determines, in a PDU session management procedure, a second AMBR based on the first AMBR, a session-AMBR of an activated PDU session of the slice, and a flow control bit rate of a QoS flow of the activated PDU session of the slice. The flow control bit rate herein may be a GFBR or an MFBR.

The PDU session management procedure herein includes a PDU session establishment procedure, a PDU session modification procedure, and a PDU session release procedure. For example, when a new PDU session is established, deactivated, or released, the RAN performs calculation to obtain the second AMBR. For another example, when a session-AMBR changes, the RAN performs calculation to obtain the second AMBR.

For a method for obtaining the second AMBR, the following provides two different implementation methods, and certainly, the method is not limited to the two implementation methods.

Implementation method 1: If the first AMBR indicates the sum of the quantity of GBR resources and the quantity of non-GBR resources in the slice, the second AMBR=min (sum(the session-AMBR of the activated PDU session of the slice)+sum(the flow control bit rate of the QoS flow of the activated PDU session of the slice), the first AMBR).

That is, the second AMBR is used to indicate a maximum value of a quantity of resources allowed to be used in the slice.

The flow control bit rate of the QoS flow of the activated PDU session of the slice is a flow control bit rate of a GBR QoS flow of the activated PDU session of the slice. The meaning also applies to the following descriptions, and details are not described again.

Sum(the session-AMBR of the activated PDU session of the slice) indicates a sum of session-AMBRs of the activated PDU session of the slice, and is used to indicate a quantity of non-GBR resources of the activated PDU session of the slice; or is understood as being used to indicate a maximum quantity of non-GBR resources allowed to be used by the activated PDU session of the slice.

Sum(the flow control bit rate of the QoS flow of the activated PDU session of the slice) indicates a sum of flow control bit rates of the QoS flow of the activated PDU session of the slice, and is used to indicate a quantity of GBR resources in the slice, or is understood as being used to indicate a maximum quantity of GBR resources allowed to be used by the activated PDU session of the slice.

Min indicates a comparison function. For example, min(a, b) indicates a smaller one of a and b.

A sum of the flow control bit rate of the QoS flow of the activated PDU session of the slice and the session-AMBR of the activated PDU session of the slice may also be referred to as a quantity of resources of the PDU session.

In an example, the RAN receives: {S-NSSAI 1, slice-AMBR 1} and {S-NSSAI 2, slice-AMBR 2}. That is, the first AMBR includes the slice-AMBR 1 and the slice-AMBR 2. A second AMBR corresponding to the slice-AMBR 1 is referred to as a slice-AMBR 1', and a second AMBR corresponding to the slice-AMBR 2 is referred to as a slice-AMBR 2'.

The slice-AMBR 1'=min(sum(a session-AMBR of an activated PDU session of the slice identified by the S-NSSAI 1)+sum(a flow control bit rate of a QoS flow of the activated PDU session of the slice identified by the S-NSSAI 1), the slice-AMBR 1).

The slice-AMBR 2'=min(sum(a session-AMBR of an activated PDU session of the slice identified by the S-NSSAI 2)+sum(a flow control bit rate of a QoS flow of the activated PDU session of the slice identified by the S-NSSAI 2), the slice-AMBR 2).

Implementation method 2: If the first AMBR includes the quantity of GBR resources and the quantity of non-GBR resources in the slice, the second AMBR also includes the quantity of GBR resources and the quantity of non-GBR resources. The quantity of GBR resources in the second AMBR=min(sum(the flow control bit rate of the QoS flow of the activated PDU session of the slice), the quantity of GBR resources in the first AMBR). The quantity of non-GBR resources in the second AMBR=min(sum(the session-AMBR of the activated PDU session of the slice), the quantity of non-GBR resources in the first AMBR).

That is, the quantity of GBR resources in the second AMBR is used to indicate a maximum value of a quantity of GBR resources allowed to be used in the slice; and the quantity of non-GBR resources in the second AMBR is used to indicate a maximum value of a quantity of non-GBR resources allowed to be used in the slice.

In an example, the RAN receives {S-NSSAI 1, GBR resource: slice-AMBR 11, non-GBR resource: slice-AMBR 12} and {S-NSSAI 2, GBR resource: slice-AMBR 21, non-GBR resource: slice-AMBR 22}. To be specific, a first AMBR corresponding to the slice identified by the S-NSSAI 1 includes the slice-AMBR 11 and the slice-AMBR 12. A first AMBR corresponding to the slice identified by the S-NSSAI 2 includes the slice-AMBR 21 and the slice-AMBR 22. The slice-AMBR 11 and the slice-AMBR 21 are used to indicate quantities of GBR resources. The slice-AMBR 12 and the slice-AMBR 22 are used to indicate quantities of non-GBR resources.

A second AMBR corresponding to the slice identified by the S-NSSAI 1 includes the slice-AMBR 11' and the slice-AMBR 12'. A second AMBR corresponding to the slice identified by the S-NSSAI 2 includes the slice-AMBR 21' and the slice-AMBR 22'. The slice-AMBR 11' and the slice-AMBR 21' are used to indicate quantities of GBR resources. The slice-AMBR 12' and the slice-AMBR 22' are used to indicate quantities of non-GBR resources.

The slice-AMBR 11'=min(sum(a flow control bit rate of a QoS flow of an activated PDU session of the slice identified by the S-NSSAI 1), the slice-AMBR 11).

The slice-AMBR 12'=min(sum(a session-AMBR of the activated PDU session of the slice identified by S-NSSAI 1), the slice-AMBR 12).

The slice-AMBR 21'=min(sum(a flow control bit rate of a QoS flow of an activated PDU session of the slice identified by the S-NSSAI 2), the slice-AMBR 21).

The slice-AMBR 22'=min(sum(a session-AMBR of the activated PDU session of the slice identified by the S-NSSAI 2), the slice-AMBR 22).

Step 405: The RAN performs traffic control based on the second AMBR.

The second AMBR herein is used to indicate an upper limit of traffic, and specifically, corresponds to the implementation method 1 of step 404. The second AMBR is used to indicate a maximum quantity of resources allowed to be used, and corresponds to the implementation method 2 of step 404. The second AMBR is used to indicate the maximum quantity of GBR resources allowed to be used and the maximum quantity of non-GBR resources allowed to be used.

The method for performing traffic control based on the second AMBR in this step may be described in the following two cases.

Case 1: The second AMBR indicates the sum of the quantity of GBR resources and the quantity of non-GBR resources in the slice.

This case corresponds to the implementation method 1 of step 404.

In an example, the RAN receives a first request, where the first request is used to request to allocate a GBR resource to a first QoS flow of the activated PDU session of the slice. If a quantity of GBR resources requested to be allocated to the first QoS flow is greater than a difference between the second AMBR and a quantity of resources currently occupied by the slice, the RAN rejects allocation of a GBR resource to the first QoS flow. For example, the second AMBR is 50 M, the quantity of resources currently occupied by the slice is 40 M, and the quantity of GBR resources requested to be allocated to the first QoS flow is 20 M. Because 20>50−40, it indicates that remaining resources in the slice are insufficient for allocation. Further, the RAN may further send QoS notification control (QNC) of the first QoS flow to the SMF, to notify that allocation of the GBR resource to the first QoS flow is rejected. Alternatively, if a quantity of GBR resources requested to be allocated to the first QoS flow is less than or equal to a difference between the second AMBR and a quantity of resources currently occupied by the slice, the RAN determines to allocate a GBR resource to the first QoS flow. For example, the second AMBR is 50 M, the quantity of resources currently occupied by the slice is 40 M, and the quantity of GBR resources requested to be allocated to the first QoS flow is 5 M. Because 5<50−40, it indicates that remaining resources in the slice are sufficient for allocation. Further, the RAN may feed back, to the SMF, a quantity of GBR resources that can be allocated.

In another example, if the actual traffic of the slice is greater than the second AMBR, that is, a total quantity of resources occupied by data packets of all activated PDU sessions of the slice exceeds the second AMBR, the RAN may discard the data packets of the PDU sessions. Optionally, the RAN may preferentially discard a data packet in a QoS flow of a non-GBR type, to ensure transmission of a data packet in a QoS flow of a GBR type.

Case 2: The second AMBR includes the quantity of GBR resources and the quantity of non-GBR resources in the slice.

This case corresponds to the implementation method 2 of step 404.

In this case, traffic control needs to be separately performed on a GBR resource and a non-GBR resource.

In an example, the RAN receives a first request, where the first request is used to request to allocate a GBR resource to a first QoS flow of the activated PDU session of the slice. If a quantity of GBR resources requested to be allocated to the first QoS flow is greater than a difference between the quantity of GBR resources in the second AMBR and a quantity of GBR resources currently occupied by the slice, the RAN rejects allocation of a GBR resource to the first QoS flow. For example, the quantity of GBR resources in the second AMBR is 20 M, the quantity of GBR resources currently occupied by the slice is 10 M, and the quantity of GBR resources requested to be allocated to the first QoS flow is 15 M. Because 15>20−10, it indicates that remaining GBR resources in the slice are insufficient for allocation. Further, the RAN may further send QNC of the first QoS flow to the SMF, to notify that allocation of the GBR resource to the first QoS flow is rejected. Alternatively, if a quantity of GBR resources requested to be allocated to the first QoS flow is less than or equal to a difference between the quantity of GBR resources in the second AMBR and a quantity of GBR resources currently occupied by the slice, the RAN determines to allocate a GBR resource to the first QoS flow. For example, the quantity of GBR resources in the second AMBR is 20 M, the quantity of GBR resources currently occupied by the slice is 10 M, and the quantity of GBR resources requested to be allocated to the first QoS flow is 5 M. Because 5<20−10, it indicates that remaining GBR resources in the slice are sufficient for allocation. Further, the RAN may feed back, to the SMF, a quantity of GBR resources that can be allocated.

In another example, if the actual traffic of the slice is greater than the quantity of non-GBR resources in the second AMBR, that is, a total quantity of non-GBR resources occupied by data packets of all activated PCU sessions of the slice exceeds the quantity of non-GBR resources in the second AMBR, the RAN may discard the data packets of the PDU.

Based on the foregoing solution, an implementation method for performing traffic control based on an AMBR of a slice is provided. The AMBR of the slice may be used to indicate a quantity of GBR resources and a quantity of non-GBR resources in the slice. This helps improve accuracy of performing traffic control.

Figure 5:
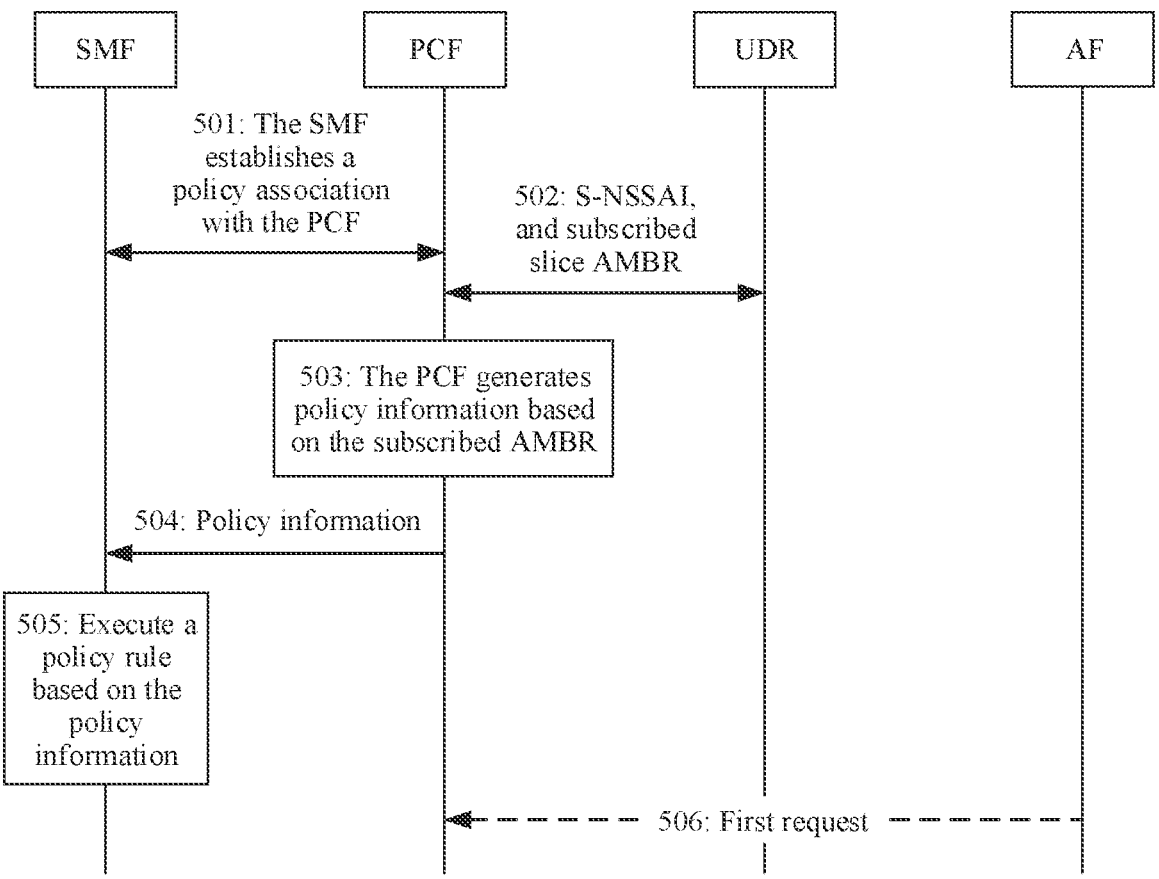
FIG. 5 is a schematic flowchart of another communication method according to this application.

FIG. 5 is a schematic flowchart of another communication method according to this application. The method includes the following steps.

Step 501: When a PDU session is established, an SMF establishes a policy association with a PCF.

For example, the SMF may send an Npcf_SMPolicyControl_Create request to the PCF, to request to establish the policy association between the SMF and the PCF.

Step 502: The PCF obtains, from a UDR, a slice identifier and a subscribed slice AMBR corresponding to the slice identifier.

For example, the PCF may obtain, from the UDR by invoking a service-oriented operation Nudr_DM_Query or Nudr_DM_Subscribe of the UDR, the slice identifier and the subscribed slice AMBR corresponding to the slice identifier.

Specific representation forms of the slice identifier and the subscribed slice AMBR corresponding to the slice identifier that are obtained by the PCF from the UDR may be the same as representation forms of the slice identifier and the subscribed slice AMBR corresponding to the slice identifier that are obtained in step 401 in the embodiment in FIG. 4. Refer to the foregoing descriptions. Details are not described herein again.

Step 503: The PCF generates policy information based on the subscribed slice AMBR.

The generating policy information herein includes but is not limited to:

(1) Generate a session-AMBR of a PDU session of a slice based on the subscribed slice AMBR.

(2) Generate a flow control bit rate of a QoS flow of the PDU session of the slice based on the subscribed slice AMBR. The flow control bit rate herein may be a GF BR or an MFBR.

In a first implementation, if the specific representation forms of the slice identifier and the subscribed slice AMBR corresponding to the slice identifier that are obtained by the PCF from the UDR in step 502 are the same as those in the implementation method 1 of step 401 in the embodiment in FIG. 4, in step 503, the PCF may perform the following operation: based on the subscribed slice AMBR, a sum of the generated session-AMBR of the PDU session of the slice and flow control bit rates of all QoS flows of the PDU session does not exceed the subscribed slice AMBR.

In a second implementation, if the specific representation forms of the slice identifier and the subscribed slice AMBR corresponding to the slice identifier that are obtained by the PCF from the UDR in step 502 are the same as those in the implementation method 2 of step 401 in the embodiment in FIG. 4, in step 503, the PCF may perform the following operation: based on the subscribed slice AMBR, a sum of generated session-AMBRs of PDU sessions of the slice does not exceed a quantity of non-GBR resources in the subscribed slice AMBR; and based on the subscribed slice AMBR, a sum of generated flow control bit rates of QoS flows of PDU sessions of the slice does not exceed a quantity of GBR resources in the subscribed slice AMBR. The flow control bit rate herein may be a GFBR or an MFBR.

Step 504: The PCF sends the policy information to the SMF. Correspondingly, the SWF may receive the policy information.

For example, the PCF generates a policy and charging control (PCC) rule, where the PCC rule includes the policy information, and the policy information includes the sum of the flow control bit rates of the QoS flows of the PDU sessions of the slice. For another example, the PCF generates policy information related to the PDU session, where the policy information includes the session-AMBR of the PDU session of the slice.

For example, the PCF may send an Npcf_SMPolicyControl_Create response to the SMF, where the Npcf_SMPolicyControl_Create response carries the PCC rule and the policy information related to the PDU session.

Step 505: The SMF executes a policy rule based on the policy information.

The SMF may perform traffic control based on the policy information. For example, based on the session-AMBR of the PDU session, a non-GBR resource of the PDU session is controlled via a UPF. For another example, based on the flow control bit rate of the QoS flow of the PDU session, a GBR resource of the PDU session is controlled via a UPF. Details are described below.

Case 1: Based on the flow control bit rate of the QoS flow of the PDU session of the slice, the GBR resource of the PDU session is controlled via the UPF.

In an example, the SMF receives a first request, where the first request is used to request to allocate a GBR resource to a first QoS flow of an activated PDU session of the slice. If a quantity of GBR resources requested to be allocated to the first QoS flow is greater than a difference between a sum of the flow control bit rate of the QoS flow of the PDU session of the slice and a quantity of GBR resources currently occupied by the slice, the SMF rejects allocation of a GBR resource to the first QoS flow. Alternatively, if a quantity of GBR resources requested to be allocated to the first QoS flow is less than or equal to a difference between a sum of the flow control bit rate of the QoS flow of the PDU session of the slice and a quantity of GBR resources currently occupied by the slice, the SMF determines to allocate a GBR resource to the first QoS flow.

Case 2: Based on the session-AMBR of the PDU session of the slice, the non-GBR resource of the PDU session is controlled via the UPF.

In an example, if the actual traffic of the slice is greater than a sum of session-AMBRs of PDU sessions of the slice, that is, a total quantity of non-GBR resources occupied by data packets of all activated PDU sessions of the slice exceeds a sum of session-AMBRs of all PDU sessions of the slice, the UPF may discard the data packets of the PDU sessions.

Step 506: An AF sends the first request to the PCF. Correspondingly, the PCF may receive the first request.

The first request includes a QoS requirement, for example, a required bandwidth.

The PCF may perform traffic control on the AF based on the policy information, for example, determine whether to allocate a GBR resource or a non-GBR resource to the AF. A specific implementation method in which the PCF performs traffic control on the AF is similar to the method in which the SMF performs traffic control in step 505, and details are not described herein again.

Step 506 is optional.

Based on the foregoing solution, an implementation method for performing traffic control based on an AMBR of a slice is provided. The AMBR of the slice may be used to indicate a quantity of GBR resources and a quantity of non-GBR resources in the slice. This helps improve accuracy of performing traffic control.

Figure 6:
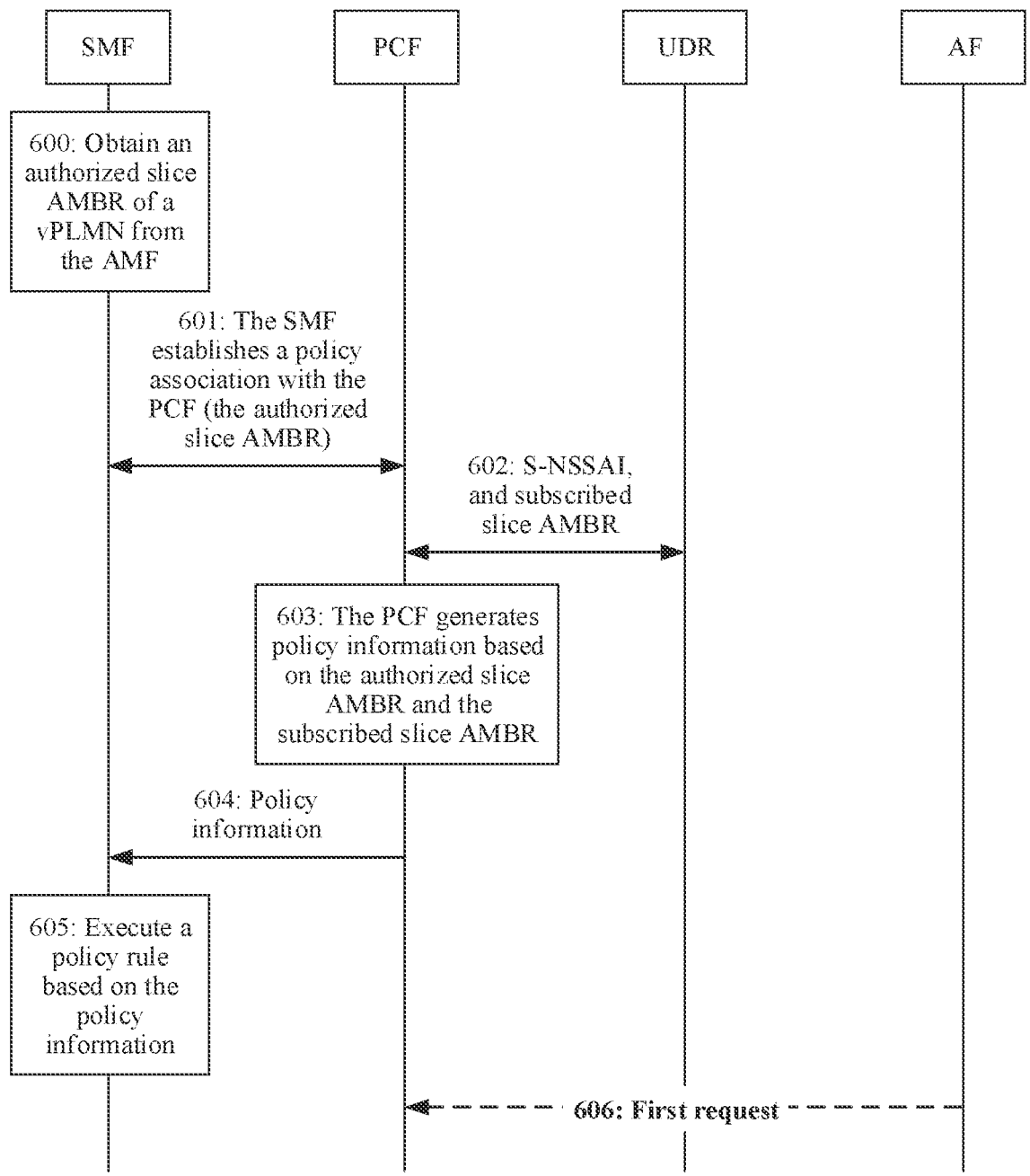
FIG. 6 is a schematic flowchart of another communication method according to this application.

FIG. 6 is a schematic flowchart of another communication method according to this application. This solution is applicable to a home routed (HR) roaming scenario.

The method includes the following steps.

Step 600: In a PDU session establishment process, an SMF obtains an authorized slice AMBR of a vPLMN from an AMF.

The SMF herein refers to a home SMF, Which may also be referred to as an hSMF.

Optionally, a specific implementation in which the AMF obtains the authorized slice AMBR of the vPLMN may be similar to that in related descriptions in step 401 and step 402 in the embodiment in FIG. 4, and details are not described herein again.

Optionally, for example, a manner in Which the SMF obtains the authorized slice AMBR of the vPLMN from the AMF may be that the AMF sends the authorized slice AMBR of the vPLMN to the SMF via a vSMF. The vSMF herein refers to a visited SMF.

Step 601: When a PDU session is established, the SMF establishes a policy association with a PCF.

For example, the SMF may send an Npcf_SMPolicyControl_Create request to the PCF, to request to establish the policy association between the SMF and the PCF.

In this step, the SMF sends the authorized slice AMBR to the PCF.

Step 602 is the same as step 502 in the embodiment in FIG. 5.

Step 603: The PCF generates policy information based on the authorized slice AMBR and a subscribed slice AMBR The generating policy information herein includes but is not limited to:

(1) Generate a sum of session-AMBRs of PDU sessions of a slice based on the authorized slice AMBR and the subscribed slice AMBR.

(2) Generate a sum of flow control bit rates of QoS flows of PDU sessions based on the authorized slice AMBR and the subscribed slice AMBR. The flow control bit rate herein may be a GFBR or an MFBR.

Step 604: The PCF sends the policy information to the SMF. Correspondingly, the SMF may receive the policy information.

For example, the PCF generates a PCC rule, where the PCC rule includes the policy information, and the policy information includes the sum of the flow control bit rates of the QoS flows of the PDU sessions of the slice. For another example, the PCF generates policy information related to the PDU session, where the policy information includes the sum of the session-AMBRs of the PM sessions of the slice.

For example, the PCF may send an Npcf_SMPolicyControl_Create response to the SMF, where the Npcf_SMPolicyControl_Create response carries the PCC rule and the policy information related to the PDU session.

Step 605 and step 606 are the same as step 505 and step 506 in the embodiment in FIG. 5.

Based on the foregoing solution, an implementation method for performing traffic control based on an AMBR of a slice is provided. The AMBR of the slice may be used to indicate a quantity of GBR resources and a quantity of non-GBR resources in the slice. This helps improve accuracy of performing traffic control.

The foregoing mainly describes the solutions provided in this application from a perspective of interaction between network elements. It may be understood that to implement the foregoing functions, each network element includes a corresponding hardware structure and/or software module for implementing each function. A person skilled in the art should easily be aware that, in combination with the units and algorithm steps in the examples described in embodiments disclosed in this specification, the present invention may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

An embodiment of this application further provides an apparatus configured to implement any one of the foregoing methods. For example, an apparatus is provided, and the apparatus includes units (or means) configured to implement the steps performed by the access network device in any one of the foregoing methods. For another example, another apparatus is further provided, and the apparatus includes units (or means) configured to implement the steps performed by the policy control network element in any one of the foregoing methods.

Figure 7:
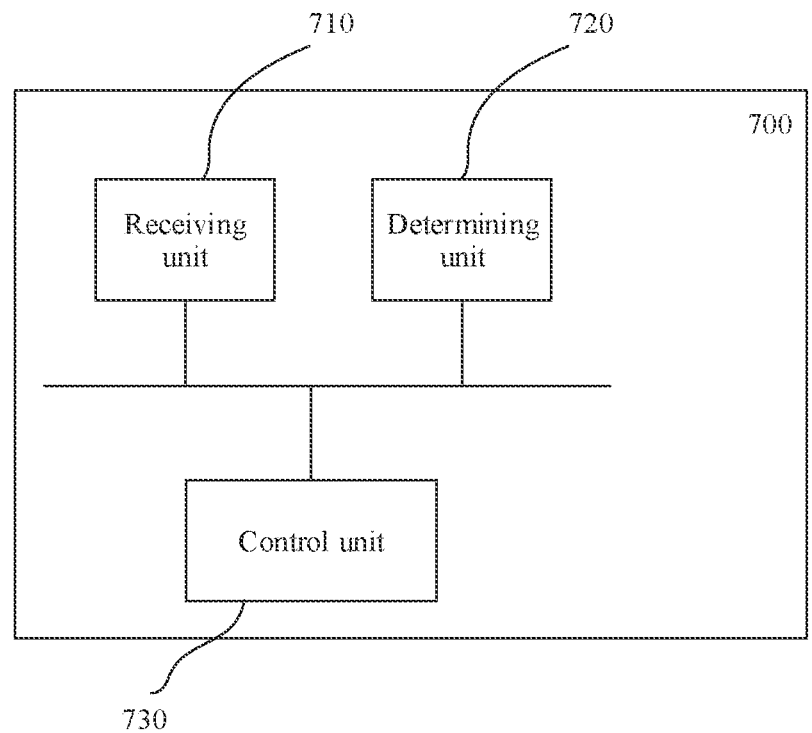
FIG. 7 is a schematic diagram of a communication apparatus according to this application.

FIG. 7 is a schematic diagram of a communication apparatus according to an embodiment of this application. The apparatus is used in an access network device. As shown in FIG. 7, the apparatus 700 includes a receiving unit 710, a determining unit 720, and a control unit 730.

The receiving unit 710 is configured to receive a first AMBR of a slice, where the first AMBR is used to indicate a quantity of GBR resources and a quantity of non-GBR resources in the slice, and the first AMBR is a subscribed slice AMBR or an authorized slice AMBR. The determining unit 720 is configured to determine a second AMBR of the slice based on the first AMBR, a session-AMBR of a PDU session of the slice, and a flow control bit rate of a QoS flow of an activated PDU session of the slice, where the flow control bit rate is a GFBR or an MBR. The control unit 730 is configured to perform traffic control on the slice based on the second AMBR.

In a possible implementation method, the first AMBR is equal to a sum of the quantity of GBR resources and the quantity of non-GBR resources in the slice; and that the determining unit 720 is configured to determine a second AMBR of the slice based on the first AMBR, a session-AMBR of an activated PDU session of the slice, and a flow control bit rate of a QoS flow of the activated PDU session of the slice specifically includes: determining that the second AMBR is the smaller one of the first AMBR and a sum of the flow control bit rate of the QoS flow of the activated PDU session of the slice and the session-AMBR of the activated PDU session of the slice.

In a possible implementation method, the second AMBR is used to indicate a maximum value of a quantity of resources allowed to be used in the slice.

In a possible implementation method, that the control unit 730 is configured to perform traffic control on the slice based on the second AMBR specifically includes: if a quantity of GBR resources requested to be allocated to a first QoS flow is greater than a difference between the second AMBR and a quantity of resources currently occupied by the slice, rejecting allocation of a GBR resource to the first QoS flow; if a quantity of GBR resources requested to be allocated to a first QoS flow is less than or equal to a difference between the second AMBR and a quantity of resources currently occupied by the slice, determining to allocate a GBR resource to the first QoS flow; or if actual traffic of the slice is greater than the second AMBR, discarding a data packet of a PDU session of the slice.

In a possible implementation method, the first AMBR includes the quantity of GBR resources and the quantity of non-GBR resources; and that the determining unit 720 is configured to determine a second AMBR of the slice based on the first AMBR, a session-AMBR of an activated PDU session of the slice, and a flow control bit rate of a QoS flow of the activated PDU session of the slice includes: determining that a quantity of GBR resources in the second AMBR is the smaller one of the flow control bit rate of the QoS flow of the activated PDU session of the slice and the quantity of GBR resources in the first AMBR; and determining that a quantity of non-GBR resources in the second AMBR is the smaller one of the session-AMBR of the activated PDU session of the slice and the quantity of non-GBR resources in the first AMBR.

In a possible implementation method, the quantity of GBR resources in the second AMBR is used to indicate a maximum value of a quantity of GBR resources allowed to be used in the slice; and the quantity of non-GBR resources in the second AMBR is used to indicate a maximum value of a quantity of non-GBR resources allowed to be used in the slice.

In a possible implementation method, that the control unit 730 is configured to perform traffic control on the slice based on the second AMBR includes: if a quantity of GBR resources requested to be allocated to a first QoS flow is greater than a difference between the quantity of GBR resources in the second AMBR and a quantity of GBR resources currently occupied by the slice, rejecting allocation of a GBR resource to the first QoS flow; if a quantity of GBR resources requested to be allocated to a first QoS flow is less than or equal to a difference between the quantity of GBR resources in the second AMBR and a quantity of GBR resources currently occupied by the slice, determining to allocate a GBR resource to the first QoS flow; or if actual traffic of the slice is greater than the quantity of non-GBR resources in the second AMBR, discarding a data packet of a PDU session of the slice.

Figure 8:
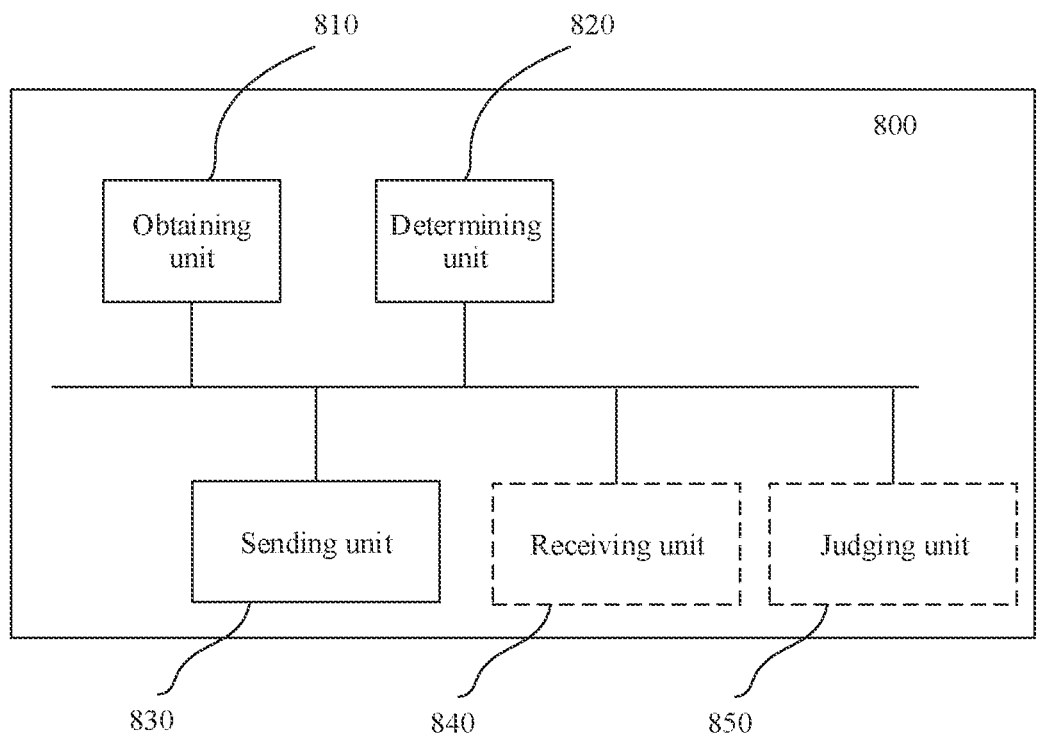
FIG. 8 is a schematic diagram of another communication apparatus according to this application.

FIG. 8 is a schematic diagram of another communication apparatus according to an embodiment of this application. The apparatus is used in a policy control network element. As shown in FIG. 8, the apparatus 800 includes an obtaining unit 810, a determining unit 820, and a sending unit 830. Optionally, the apparatus may further include a receiving unit 840 and a judging unit 850.

The obtaining unit 810 is configured to obtain a subscribed AMBR of a slice, where the subscribed AMBR is used to indicate a quantity of GBR resources and a quantity of non-GBR resources in the slice. The determining unit 820 is configured to determine policy information based on the subscribed AMBR, where the policy information includes at least one of a session-AMBR of a PDU session or a flow control bit rate of a QoS flow of a PDU session. The sending unit 830 is configured to send the policy information to a session management network element.

In a possible implementation method, the subscribed AMBR is equal to a sum of the quantity of GBR resources and the quantity of non-GBR resources in the slice; or the subscribed AMBR includes the quantity of GBR resources in the slice and the quantity of non-GBR resources in the slice.

In a possible implementation method, the receiving unit 840 is configured to receive an authorized AMBR of the slice from the session management network element, where the authorized AMBR is from a visited policy control network element; and that the determining unit is configured to determine policy information based on the subscribed AMBR specifically includes: determining the policy information based on the subscribed AMBR and the authorized AMBR.

In a possible implementation method, the receiving unit 840 is configured to receive a first request from an application function network element, where the first request is used to include a QoS requirement; and the judging unit 850 is configured to determine, based on the policy information, whether to allocate a GBR resource or a non-GBR resource to the application function network element.

It should be understood that division of the foregoing apparatus into the units is merely logical function division. During actual implementation, all or some of the units may be integrated into one physical entity, or may be physically separated. In addition, all of the units in the apparatus may be implemented in a form of software invoked by a processing element, or may be implemented in a form of hardware; or some of the units may be implemented in a form of software invoked by a processing element, and some of the units may be implemented in a form of hardware. For example, each unit may be a separately disposed processing element, or may be integrated into a chip in the apparatus. In addition, each unit may be stored as a program in a memory and invoked by a processing element of the apparatus to perform a function of the unit. In addition, these units may be all or partially integrated, or may be implemented independently. The processing element herein may also be referred to as a processor, and may be an integrated circuit having a signal processing capability. In an implementation process, the steps in the foregoing method or the foregoing units may be implemented by using a hardware integrated logic circuit in the processor element, or may be implemented in a form of software invoked by the processing element.

In an example, the unit in any one of the foregoing apparatuses may be one or more integrated circuits configured to implement the foregoing methods, for example, one or more application-specific integrated circuits (ASICs), one or more microprocessors (DSPs), one or more field programmable gate arrays (FPGAs), or a combination of at least two of these forms of integrated circuits. For another example, when the unit in the apparatus may be implemented in a form of a program invoked by a processing element, the processing element may be a general-purpose processor, for example, a central processing unit (CPU) or another processor that can invoke the program. For still another example, these units may be integrated together, and implemented in a form of a system-on-a-chip (SOC).

The foregoing receiving unit (for example, the receiving unit) is an interface circuit of the apparatus, and is configured to receive a signal from another apparatus. For example, when the apparatus is implemented in a manner of a chip, the receiving unit is an interface circuit that is of the chip and that is configured to receive a signal from another chip or apparatus. The foregoing sending unit (for example, the sending unit) is an interface circuit of the apparatus, and is configured to send a signal to another apparatus. For example, when the apparatus is implemented in a manner of a chip, the sending unit is an interface circuit that is of the chip and that is configured to send a signal to another chip or apparatus.

Figure 9:
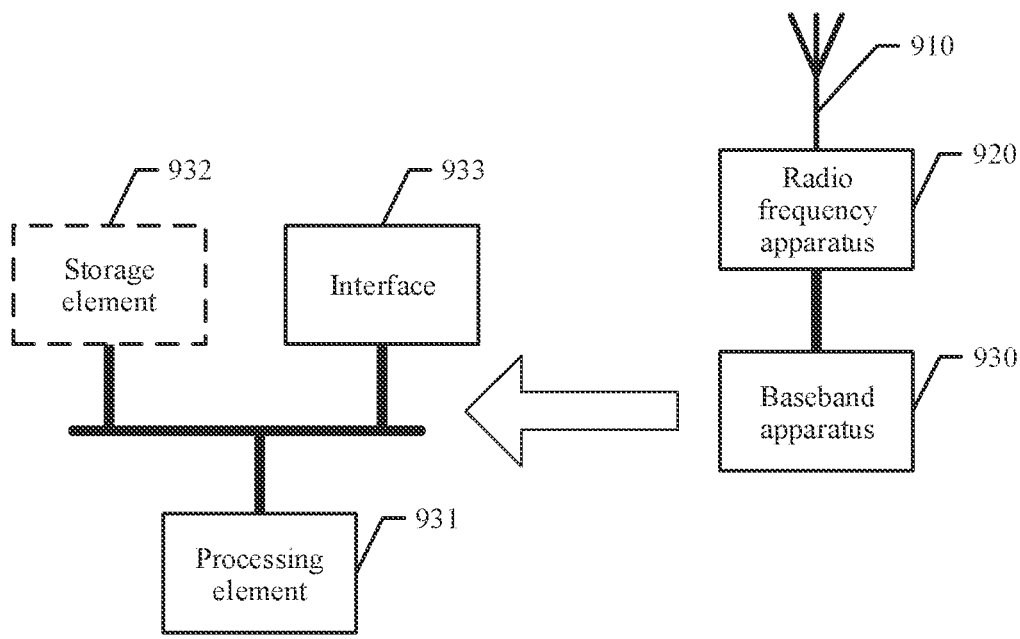
FIG. 9 is a schematic diagram of an access network device according to this application.

FIG. 9 is a schematic diagram of a structure of an access network device according to an embodiment of this application. The access network device is configured to implement operations of the access network device in the foregoing embodiments. As shown in FIG. 9, the access network device includes an antenna 910, a radio frequency apparatus 920, and a baseband apparatus 930. The antenna 910 is connected to the radio frequency apparatus 920. In an uplink direction, the radio frequency apparatus 920 receives, by using the antenna. 910, information sent by a terminal device, and sends the information sent by the terminal device, to the baseband apparatus 930 for processing. In a downlink direction, the baseband apparatus 930 processes information about the terminal device, and sends the information to the radio frequency apparatus 920; and the radio frequency apparatus 920 processes the information about the terminal device, and then sends the processed information to the terminal device by using the antenna 910.

The baseband apparatus 930 may include one or more processing elements 931 and interfaces 933. The processing element 931 includes, for example, a main control CPU and another integrated circuit. In addition, the baseband apparatus 930 may further include a storage element 932. The storage element 932 is configured to store a program and data. The interface 933 is configured to exchange information with the radio frequency apparatus 920. For example, the interface is a common public radio interface (CPRI). The foregoing apparatus used in the access network device may be located in the baseband apparatus 930. For example, the foregoing apparatus used in the access network device may be a chip in the baseband apparatus 930. The chip includes at least one processing element and an interface circuit. The processing element is configured to perform the steps of any one of the methods performed by the access network device. The interface circuit is configured to communicate with another apparatus. In an implementation, units of the access network device that implement the steps in the foregoing methods may be implemented by a processing element scheduling a program. For example, the apparatus used in the access network device includes a processing element and a storage element. The processing element invokes a program stored in the storage element, to perform the methods performed by the access network device in the foregoing method embodiments. The storage element may be a storage element on the same chip as the processing element, that is, an on-chip storage element, or may be a storage element that is on a different chip from the processing element, that is, an off-chip storage element.

In another implementation, units of the access network device that implement the steps in the foregoing methods may be configured as one or more processing elements. These processing elements are disposed in the baseband apparatus. The processing element herein may be an integrated circuit, for example, one or more ASICs, one or more DSPs, one or more FPGAs, or a combination of these types of integrated circuits. These integrated circuits may be integrated together to form a chip.

Units of the access network device that implement the steps in the foregoing methods may be integrated together, and implemented in a form of an SOC. For example, the baseband apparatus includes an SOC chip, configured to implement the foregoing methods. At least one processing element and storage element may be integrated into the chip, and the processing element invokes a program stored in the storage element to implement the foregoing methods performed by the access network device. Alternatively, at least one integrated circuit may be integrated into the chip, to implement the foregoing methods performed by the access network device. Alternatively, with reference to the foregoing implementations, functions of some units may be implemented by invoking a program by the processing element, and functions of some units may be implemented by the integrated circuit.

It can be learned that the foregoing apparatus used in the access network device may include at least one processing element and an interface circuit. The at least one processing element is configured to perform any one of the methods performed by the access network device provided in the foregoing method embodiments. The processing element may perform some or all steps performed by the access network device, in a first manner, to be specific, by invoking the program stored in the storage element; or may perform some or all steps performed by the access network device, in a second manner, to be specific, by using a hardware integrated logic circuit in the processor element in combination with instructions; or may certainly perform, by combining the first manner and the second manner, some or all steps performed by the access network device.

As described above, the processing element herein may be a general-purpose processor, for example, a CPU, or may be one or more integrated circuits, for example, one or more ASICs, one or more microprocessors DSPs, or one or more FPGAs, or a combination of at least two of these types of integrated circuits, configured to implement the foregoing methods. The storage element may be a memory, or may be a general name of a plurality of storage elements.

Figure 10:
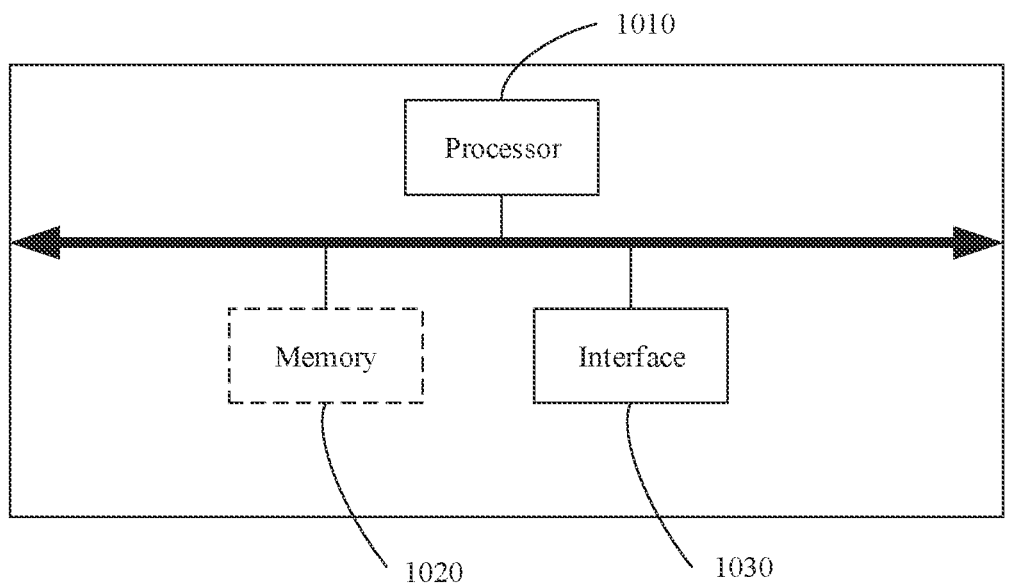
FIG. 10 is a schematic diagram of a policy control network element according to this application.

FIG. 10 is a schematic diagram of a structure of a policy control network element according to an embodiment of this application. The policy control network element is configured to implement operations of the policy control network element in the foregoing embodiment. As shown in FIG. 10, the policy control network element includes a processor 1010, a memory 1020, and an interface 1030. The processor 1010 and the interface 1030 are signal-connected. Optionally, the policy control network element may further include the memory 1020.

The method performed by the policy control network element in the foregoing embodiments may be implemented by the processor 1010 by invoking a program stored in the memory 1020. That is, the apparatus used in the policy control network element includes a memory and a processor. The memory is configured to store a program, and the program is invoked by the processor to perform the method performed by the policy control network element in the foregoing method embodiments. The processor herein may be an integrated circuit having a signal processing capability, for example, a CPU. The apparatus used in the policy control network element may be implemented by one or more integrated circuits configured to implement the foregoing method, for example, one or more ASICs, one or more microprocessors DSPs, or one or more FPGAs, or a combination of at least two of these types of integrated circuits. Alternatively, the foregoing implementations may be combined.

In an implementation method, the determining unit 720 and the control unit 730 in the communication apparatus shown in FIG. 7 may be implemented by the processing element 931 of the access network device shown in FIG. 9, and the receiving unit 710 in the communication apparatus shown in FIG. 7 may be implemented by the interface 933 of the access network device shown in FIG. 9.

In an implementation method, the obtaining unit 810, the determining unit 820, and the judging unit 850 in the communication apparatus shown in FIG. 8 may be implemented by the processor 1010 of the policy control network element shown in FIG. 10, and the sending unit 830 and the receiving unit 840 in the communication apparatus shown in FIG. 8 may be implemented by the interface 1030 of the policy control network element shown in FIG. 10.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk drive, or a magnetic tape), an optical medium (for example, a DVD), a semiconductor medium (for example, a solid-state drive (SSD)), or the like.

The various illustrative logical units and circuits described in embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

In one or more example designs, the functions described in this application may be implemented by using hardware, software, firmware, or any combination thereof. If the functions are implemented by using software, these functions may be stored in a computer-readable medium or transmitted on a computer-readable medium in a form of one or more instructions or code. The computer-readable medium includes a computer storage medium or a communication medium that enables a computer program to move from one place to another place. The storage medium may be any available medium accessible by a general-purpose computer or a special computer. For example, such a computer-readable medium may include but not limited to a RAM, a ROM, an EEPROM, a CD-ROM, or another optical disc storage, a disk storage or another magnetic storage apparatus, or any other medium that can be used to carry or store program code, where the program code is in an instruction form or a data structure form or in a form that can be read by a general-purpose or special computer or a general-purpose or special processor. In addition, any connection may be appropriately defined as a computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in the defined computer-readable medium. The disk and the disc include a compact disc, a laser disc, an optical disc, a digital versatile disc (DVD for short), a floppy disk, and a Blu-ray disc. The disc usually copies data by a magnetic means, and the disk optically copies data by a laser means. The foregoing combination may also be included in the computer-readable medium.

A person skilled in the art should be aware that in the foregoing one or more examples, functions described in this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium. The communication medium includes any medium that facilitates transmission of a computer program from one place to another. The storage medium may be any available medium accessible to a general-purpose or dedicated computer.

Although this application is described with reference to specific features and embodiments thereof, it is clear that various modifications and combinations may be made to them without departing from the spirit and scope of this application. Correspondingly, the specification and accompanying drawings are merely example descriptions of this application defined by the appended claims, and are considered as any of and all modifications, variations, combinations or equivalents that cover the scope of this application. It is clear that a person skilled in the art can make various modifications and variations to this application without departing from the scope of this application. In this way, this application is intended to cover these modifications and variations of this application provided that they fall within the scope of the claims of this application and their equivalent technologies.

What is claimed is:

1. A communication method, comprising:
receiving a first aggregated maximum bit rate (AMBR) of a slice, wherein the first AMBR indicates a quantity of guaranteed bit rate (GBR) resources and a quantity of non-GBR resources in the slice, and the first AMBR is a subscribed slice AMBR or an authorized slice AMBR; and
performing traffic control on the slice based on the first AMBR, a session-AMBR of an activated protocol data unit (PDU) session of the slice, and a flow control bit rate of a GBR quality of service (QoS) flow of the activated PDU session of the slice, wherein the flow control bit rate is a maximum flow bit rate (MFBR).

2. The method according to claim 1, wherein the performing traffic control on the slice based on the first AMBR, the session-AMBR, and the flow control bit rate comprises:

determining a second AMBR of the slice based on the first AMBR, the session-AMBR, and the flow control bit rate; and
performing traffic control on the slice based on the second AMBR.

3. The method according to claim 2, wherein the first AMBR is equal to a sum of the quantity of GBR resources and the quantity of non-GBR resources in the slice; and
the determining a second AMBR of the slice based on the first AMBR, the session-AMBR, and the flow control bit rate comprises:
determining that the second AMBR is the smaller one of the first AMBR and a sum of the flow control bit rate of the GBR QoS flow of the activated PDU session of the slice and the session-AMBR of the activated PDU session of the slice.

4. The method according to claim 3, wherein the second AMBR indicate a maximum value of a quantity of resources allowed to be used in the slice.

5. The method according to claim 3, wherein the performing traffic control on the slice based on the second AMBR comprises:
when a quantity of GBR resources requested to be allocated to a first QoS flow of the slice is greater than a difference between the second AMBR and a quantity of resources currently occupied by the slice, rejecting allocation of a GBR resource to the first QoS flow.

6. A communication apparatus, comprising:
at least one processor; and
one or more memories coupled to the at least one processor and storing programming instructions for execution by the at least one processor to perform operations comprising:
receiving a first aggregated maximum bit rate (AMBR) of a slice, wherein the first AMBR indicates a quantity of guaranteed bit rate (GBR) resources and a quantity of non-GBR resources in the slice, and the first AMBR is a subscribed slice AMBR or an authorized slice AMBR; and
performing traffic control on the slice based on the first AMBR, a session-AMBR of an activated protocol data unit (PDU) session of the slice, and a flow control bit rate of a GBR quality of service (QoS) flow of the activated PDU session of the slice, wherein the flow control bit rate is a maximum flow bit rate (MFBR).

7. The communication apparatus according to claim 6, wherein the performing traffic control on the slice based on the first AMBR, the session-AMBR, and the flow control bit rate comprises:
determining a second AMBR of the slice based on the first AMBR, the session-AMBR, and the flow control bit rate; and
performing traffic control on the slice based on the second AMBR.

8. The communication apparatus according to claim 7, wherein the first AMBR is equal to a sum of the quantity of GBR resources and the quantity of non-GBR resources in the slice; and
wherein the determining a second AMBR of the slice based on the first AMBR, the session-AMBR, and the flow control bit rate comprises:
determining that the second AMBR is the smaller one of the first AMBR and a sum of the flow control bit rate of the GBR QoS flow of the activated PDU session of the slice and the session-AMBR of the activated PDU session of the slice.

9. The communication apparatus according to claim 8, wherein the second AMBR indicates a maximum value of a quantity of resources allowed to be used in the slice.

10. The communication apparatus according to claim 8, wherein the performing traffic control on the slice based on the second AMBR comprises:
when a quantity of GBR resources requested to be allocated to a first QoS flow of the slice is greater than a difference between the second AMBR and a quantity of resources currently occupied by the slice, rejecting allocation of a GBR resource to the first QoS flow.

11. A communication system, comprising a mobility management network element and an access network device, wherein
the mobility management network element comprises:
at least one first processor; and
one or more first memories coupled to the at least one first processor and storing first programming instructions for execution by the at least one first processor to cause the mobility management network element to perform first operations comprising
sending a first aggregated maximum bit rate (AMBR) of a slice to the access network device, wherein the first AMBR indicates a quantity of guaranteed bit rate GBR resources and a quantity of non-GBR resources in the slice, and the first AMBR is a subscribed slice AMBR or an authorized slice AMBR; and
the access network device comprises:
at least one second processor; and
one or more second memories coupled to the at least one second processor and storing second programming instructions for execution by the at least one second processor to cause the access network device to perform second operations comprising:
receiving the first AMBR; and
performing traffic control on the slice based on the first AMBR, a session-AMBR of an activated protocol data unit (PDU) session of the slice, and a flow control bit rate of a GBR quality of service (QoS) flow of the activated PDU session of the slice, wherein the flow control bit rate is a maximum flow bit rate (MFBR).

12. The communication system according to claim 11, wherein the performing traffic control on the slice based on the first AMBR, the session-AMBR, and the flow control bit rate comprises:
determining a second AMBR of the slice based on the first AMBR, the session-AMBR, and the flow control bit rate; and
performing traffic control on the slice based on the second AMBR.

13. The communication system according to claim 12, wherein the first AMBR is equal to a sum of the quantity of GBR resources and the quantity of non-GBR resources in the slice, and the determining a second AMBR of the slice based on the first AMBR, the session-AMBR, and the flow control bit rate comprises:
determining that the second AMBR is the smaller one of the first AMBR and a sum of the flow control bit rate of the GBR QoS flow of the activated PDU session of the slice and the session-AMBR of the activated PDU session of the slice.

14. The communication system according to claim 13, wherein the second AMBR indicates a maximum value of a quantity of resources allowed to be used in the slice.

15. The communication system according to claim 13, wherein the performing traffic control on the slice based on the second AMBR comprises:
- when a quantity of GBR resources requested to be allocated to a first QoS flow of the slice is greater than a difference between the second AMBR and a quantity of resources currently occupied by the slice, rejecting allocation of a GBR resource to the first QoS flow.

16. A communication method, comprising:
- sending, by a mobility management network element, a first aggregated maximum bit rate, AMBR, of a slice to an access network device, wherein the first AMBR indicates a quantity of guaranteed bit rate, GBR, resources and a quantity of non-GBR resources in the slice, and the first AMBR is a subscribed slice AMBR or an authorized slice AMBR;
- receiving, by the access network device, the first AMBR of the slice; and
- performing traffic control on the slice, by the access network device, based on the first AMBR, a session-AMBR of an activated protocol data unit, PDU, session of the slice, and a flow control bit rate of a GBR quality of service (QoS) flow of the activated PDU session of the slice, wherein the flow control bit rate is a maximum flow bit rate, MFBR.

17. The communication method according to claim 16, wherein the performing traffic control on the slice based on the first AMBR, the session-AMBR, and the flow control bit rate comprises:
- determining a second AMBR of the slice based on the first AMBR, the session-AMBR, and the flow control bit rate; and
- performing traffic control on the slice based on the second AMBR.

18. The method according to claim 17, wherein the first AMBR is equal to a sum of the quantity of GBR resources and the quantity of non-GBR resources in the slice; and
- the determining a second AMBR of the slice based on the first AMBR, the session-AMBR, and the flow control bit rate comprises:
  - determining that the second AMBR is the smaller one of the first AMBR and a sum of the flow control bit rate of the GBR QoS flow of the activated PDU session of the slice and the session-AMBR of the activated PDU session of the slice.

19. The method according to claim 18, wherein the second AMBR indicates a maximum value of a quantity of resources allowed to be used in the slice.

20. The method according to claim 18, wherein the performing traffic control on the slice based on the second AMBR comprises:
- when a quantity of GBR resources requested to be allocated to a first QoS flow of the slice is greater than a difference between the second AMBR and a quantity of resources currently occupied by the slice, rejecting allocation of a GBR resource to the first QoS flow.

* * * * *